United States Patent
Chu et al.

(10) Patent No.: US 10,928,505 B1
(45) Date of Patent: Feb. 23, 2021

(54) NULL DATA PACKET (NDP) ANNOUNCEMENT FRAME AND TRIGGER FRAME FOR NDP RANGING

(71) Applicant: Marvell International Ltd., Hamilton (BM)

(72) Inventors: Liwen Chu, San Ramon, CA (US);
Hongyuan Zhang, Fremont, CA (US);
Hui-Ling Lou, Sunnyvale, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 273 days.

(21) Appl. No.: 15/977,643

(22) Filed: May 11, 2018

Related U.S. Application Data

(60) Provisional application No. 62/505,443, filed on May 12, 2017.

(51) Int. Cl.
*G01S 13/76* (2006.01)
*H04W 84/12* (2009.01)

(52) U.S. Cl.
CPC ........... *G01S 13/765* (2013.01); *H04W 84/12* (2013.01)

(58) Field of Classification Search
CPC .............................. G01S 13/765; H04W 84/12
See application file for complete search history.

(56) References Cited

U.S. PATENT DOCUMENTS

| | | | |
|---|---|---|---|
| 9,166,660 | B2 | 10/2015 | Chu et al. |
| 2005/0026563 | A1 | 2/2005 | Leeper et al. |
| 2011/0261708 | A1 | 10/2011 | Grandhi |
| 2012/0250543 | A1* | 10/2012 | Abraham ............. H04B 7/0636 370/252 |
| 2013/0229996 | A1 | 9/2013 | Wang et al. |
| 2015/0131517 | A1 | 5/2015 | Chu et al. |
| 2016/0323879 | A1 | 11/2016 | Ghosh et al. |
| 2017/0188390 | A1 | 6/2017 | Adachi et al. |

(Continued)

OTHER PUBLICATIONS

IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

(Continued)

*Primary Examiner* — Andrew Lai
*Assistant Examiner* — Mohammed M Murshid

(57) ABSTRACT

A first communication device generates a null data packet (NDP) announcement (NDPA) frame, which indicates that the first communication device will transmit a first NDP after transmitting the NDPA frame, and which includes information that indicates the NDPA frame is part of a ranging measurement exchange session. The first communication device transmits the NDPA frame as part of the ranging measurement exchange session, and transmits the first NDP after transmitting the NDPA frame. The first communication device receives a second NDP from a second communication device as part of the ranging measurement exchange session, and receives a feedback packet from the second communication device as part of the ranging measurement exchange session. The feedback packet includes feedback information regarding the ranging measurement exchange session.

16 Claims, 15 Drawing Sheets

(56) References Cited

U.S. PATENT DOCUMENTS

| | | | |
|---|---|---|---|
| 2017/0251332 A1* | 8/2017 | Aldana | G01S 5/0226 |
| 2017/0257758 A1* | 9/2017 | Aldana | H04W 24/10 |
| 2018/0027561 A1 | 1/2018 | Segev et al. | |
| 2018/0184392 A1* | 6/2018 | Prechner | H04W 64/00 |

OTHER PUBLICATIONS

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE Std 802.11-REVmc™/D4.0, Jan. 2015 "Draft Standard for Information technology—Telecommunications and information exchange between systems—Local and metropolitan area networks—Specific requirements, Part 11: Wireless LAN Medium Access Control (MAC) and Physical Layer (PHY) Specifications," *The Institute of Electrical and Electronics Engineers, Inc.*, pp. i-cii, 293-297, 340-344, 390-392, 765, 766, 814-816, 853-859, 895-897, 1050-1054, 1137-1140, 1538-1547, 1673-1676, 1709, 1710, 1734-1743, 2152-2154, 3565, 3566 (Jan. 2015).

IEEE Std 802.11-REVmc™/D5.0, Jan. 2016, "Draft Standard for Information technology—Telecommunications and information exchange between systems—Local and metropolitan area networks—Specific requirements, Part 11: Wireless LAN Medium Access Control (MAC) and Physical Layer (PHY) Specifications," *The Institute of Electrical and Electronics Engineers, Inc.*, pp. i-ciii, 293-297, 339-343, 389-391, 777, 778, 825-827, 864-870, 907-909, 1063-1067, 1157-1160, 1554-1572, 1702-1707, 1739, 1740, 1764-1773, 2188, 2189, 3597, 3598 (Jan. 2016).

IEEE Std 802.11-REVmc™M/D8.0, Aug. 2016, "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. i-civ, 291-294, 336-341, 387-389, 771-773, 819-821, 858-865, 901-903, 1062-1066, 1158-1161, 1552-1571, 1703-1707, 1740, 1741, 1765-1775, 2193, 2194, 3601, 3602 (Aug. 2016).

Kwon et al., "SIG Structure for UL PPDU," IEEE Draft, doc. IEEE 802.11-15/0574r0, vol. 802.11ax, 18 pages (May 11, 2015).

Merlin et al., "Trigger Frame Format," IEEE Draft, doc. IEEE 802.11-15/0877r1, vol. 802.11ax, No. 1, 16 pages (Jul. 13, 2015).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

Wang, "IEEE P802.11, Wireless LANs, Specification Framework for TGaz," Revision 1.1, *Institute of Electrical and Electronics Engineers*, doc. IEEE 802.11-17/0462r4, May 11, 2017, 15 pages.

Zhu et al., "IEEE P802.11, Wireless LANs, Proposed 802.11az Functional Requirements," *Institute of Electrical and Electronics Engineers*, doc. IEEE 802.11-16/0424r4, 6 pages (Mar. 13, 2017).

* cited by examiner

*FIG. 6C*

| AID12 660 | Reserved 662 | SS Allocation 664 | Target RSSI 666 | Reserved 668 |
|---|---|---|---|---|
| 12 | 14 | 6 | 7 | 1 |

Bits:

← 612

NULL DATA PACKET (NDP) ANNOUNCEMENT FRAME AND TRIGGER FRAME FOR NDP RANGING

CROSS REFERENCES TO RELATED APPLICATIONS

This application claims the benefit of U.S. Provisional Patent Application No. 62/505,443, entitled "Null Data Packet Announcement (NDPA) and Trigger for EFTM Null Data Packet (NDP) Ranging," filed on May 12, 2017, the disclosure of which is expressly incorporated herein by reference in its entirety.

FIELD OF TECHNOLOGY

The present disclosure relates generally to wireless communication systems, and more particularly to communication exchanges between wireless communication devices for ranging measurements among the wireless communication devices.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

Some mobile communication devices include a WLAN network interface and satellite positioning technology, such as global positioning system (GPS) technology. GPS technology in mobile communication devices is useful for navigating to a desired location, for example. However, GPS technology does not typically provide accurate location information when a GPS receiver is not in direct sight of a GPS satellite, and thus GPS technology is often not useful for providing location information while a mobile communication device is within a building such as an airport, a shopping mall, etc., within a tunnel, etc.

Techniques for determining a position of a communication device using WLAN technology are now under development. For example, a distance between a first communication and a second communication device is determined by measuring a time of flight of WLAN transmissions between the first communication device and the second communication device, and the determined distance. Similarly, distances between the first communication device and multiple third communication devices are determined. Then, the determined distances are used to estimate a location of the first communication device by employing, for example, a triangulation technique. For a first communication device having multiple antennas, an angle of departure (AoD) of a WLAN transmission can be determined. Similarly, for a second communication device having multiple antennas, an angle of arrival (AoA) of the WLAN transmission from the first communication device can be determined. The AoD and the AoA, along with the determined distances, can be also be used for estimating the location of the first communication device.

SUMMARY

In an embodiment, a method is for performing a ranging measurement procedure. The method includes: generating, at a first communication device, a null data packet (NDP) announcement (NDPA) frame, wherein the NDPA frame is generated to indicate that the first communication device will transmit a first NDP after transmitting the NDPA frame, and wherein the NDPA frame is generated to include information that indicates the NDPA frame is part of a ranging measurement exchange session; transmitting, by the first communication device, the NDPA frame as part of the ranging measurement exchange session; transmitting, by the first communication device, the first NDP after transmitting the NDPA frame as part of the ranging measurement exchange session; receiving, at the first communication device, a second NDP from a second communication device as part of the ranging measurement exchange session; and receiving, at the first communication device, a feedback packet from the second communication device as part of the ranging measurement exchange session, wherein the feedback packet includes feedback information regarding the ranging measurement exchange session.

In another embodiment an apparatus comprises a network interface device associated with a first communication device. The network interface device includes one or more integrated circuits (ICs). The network interface device is configured to: generate a null data packet (NDP) announcement (NDPA) frame, wherein the NDPA frame is generated to indicate that the network interface device will transmit a first NDP after transmitting the NDPA frame, and wherein the NDPA frame is generated to include information that indicates the NDPA frame is part of a ranging measurement exchange session; transmit the NDPA frame as part of the ranging measurement exchange session; transmit the first NDP after transmitting the NDPA frame as part of the ranging measurement exchange session; receive a second NDP from a second communication device as part of the ranging measurement exchange session; and receive a feedback packet from the second communication device as part of the ranging measurement exchange session, wherein the feedback packet includes feedback information regarding the ranging measurement exchange session.

In yet another embodiment, a method is for performing a ranging measurement procedure. The method includes: receiving, at a first communication device, a null data packet (NDP) announcement (NDPA) frame, wherein the NDPA frame is from a second communication device and indicates that the second communication device will transmit an NDP transmission after transmitting the NDPA frame; processing, at the first communication device, the NDPA frame, including processing information in the NDPA frame to determine that the NDPA frame is part of a ranging measurement exchange session; receiving, at the first communication device, the first NDP after receiving the NDPA frame as part of the ranging measurement exchange session; transmitting, at the first communication device, a second NDP to the second communication device as part of the ranging measurement exchange session; generating, at the first communication device, a feedback packet to include feedback information regarding the ranging measurement exchange session; and transmitting, by the first communication device, the feedback packet to the second communication device as part of the ranging measurement exchange session.

In still another embodiment, an apparatus comprises a network interface device associated with a first communication device. The network interface device includes one or more integrated circuits (ICs). The network interface device is configured to: receive a null data packet (NDP) announcement (NDPA) frame, wherein the NDPA frame is from a second communication device and indicates that the second communication device will transmit an NDP transmission after transmitting the NDPA frame; process the NDPA frame, including processing information in the NDPA frame to determine that the NDPA frame is part of a ranging measurement exchange session; receive the first NDP after receiving the NDPA frame as part of the ranging measurement exchange session; transmit a second NDP to the second communication device as part of the ranging measurement exchange session; generate a feedback packet to include feedback information regarding the ranging measurement exchange session; and transmit the feedback packet to the second communication device as part of the ranging measurement exchange session.

In a further embodiment, a method is for performing a multi-user (MU) ranging measurement procedure. The method includes: generating, at a first communication device, a trigger frame for use in a MU ranging measurement exchange session with a plurality of second communication devices, wherein the trigger frame includes a trigger type field for indicating a type of frame exchange to which the trigger frame corresponds, wherein the trigger frame is generated to include a value in the trigger type field that indicates the trigger frame is for prompting an uplink MU NDP transmission as part of the MU ranging measurement exchange session; transmitting, by the first communication device, the trigger frame as part of the ranging measurement exchange session with the plurality of second communication devices; receiving, at the first communication device, an UL MU NDP transmission from the plurality of second communication devices as part of the ranging measurement exchange session with the plurality of second communication devices, wherein the UL MU NDP transmission is responsive to the trigger frame; transmitting, by the first communication device, a DL NDP as part of the ranging measurement exchange session with the plurality of second communication devices; and receiving, at the first communication device, an UL MU feedback transmission that includes a plurality of feedback packets from the plurality of second communication devices, wherein the plurality of feedback packets includes feedback information regarding the MU ranging measurement exchange session.

In still another embodiment, an apparatus comprises a network interface device associated with a first communication device. The network interface device includes one or more integrated circuits (ICs). The network interface device is configured to: generate a trigger frame for use in a multi-user (MU) ranging measurement exchange session with a plurality of second communication devices, wherein the trigger frame includes a trigger type field for indicating a type of frame exchange to which the trigger frame corresponds, wherein the trigger frame is generated to include a value in the trigger type field that indicates the trigger frame is for prompting an uplink MU NDP transmission as part of the MU ranging measurement exchange session; transmit the trigger frame as part of the ranging measurement exchange session with the plurality of second communication devices; receive an UL MU NDP transmission from the plurality of second communication devices as part of the ranging measurement exchange session with the plurality of second communication devices, wherein the UL MU NDP transmission is responsive to the trigger frame; transmit a DL NDP as part of the ranging measurement exchange session with the plurality of second communication devices; and receive an UL MU feedback transmission that includes a plurality of feedback packets from the plurality of second communication devices, wherein the plurality of feedback packets includes feedback information regarding the MU ranging measurement exchange session.

In still another embodiment, a method is for performing a multi-user (MU) ranging measurement procedure. The method includes: receiving, at a first communication device, a trigger frame from a second communication device, wherein the trigger frame includes a trigger type field for indicating a type of frame exchange to which the trigger frame corresponds; processing, at the first communication device, the trigger frame, including determining that the trigger frame corresponds to a MU ranging measurement exchange session based on determining that a value in the trigger type field indicates the trigger frame is for prompting an uplink MU null data packet (NDP) transmission as part of the MU ranging measurement exchange session; in response to determining that the value in the trigger type field indicates the trigger frame is for prompting the uplink MU NDP transmission as part of the MU ranging measurement exchange session, transmitting, by the first communication device, an uplink NDP as part of the uplink MU NDP transmission; receiving, at the first communication device, a downlink NDP as part of the MU ranging measurement exchange session; generating, at the first communication device, feedback information regarding the MU ranging measurement exchange session; and transmitting, by the first communication device, the feedback information in a feedback packet as part of an uplink MU feedback transmission as part of the MU ranging measurement exchange session.

In another embodiment, an apparatus comprises a network interface device associated with a first communication device. The network interface device includes one or more integrated circuits (ICs). The network interface device is configured to: receive a trigger frame from a second communication device, wherein the trigger frame includes a trigger type field for indicating a type of frame exchange to which the trigger frame corresponds; process the trigger frame, including determining that the trigger frame corresponds to an MU ranging measurement exchange session based on determining that a value in the trigger type field indicates the trigger frame is for prompting an uplink MU null data packet (NDP) transmission as part of the MU ranging measurement exchange session; in response to determining that the value in the trigger type field indicates the trigger frame is for prompting the uplink MU NDP transmission as part of the MU ranging measurement exchange session, transmit an uplink NDP as part of the uplink MU NDP transmission; receive a downlink NDP as part of the MU ranging measurement exchange session; generate feedback information regarding the MU ranging measurement exchange session; and transmit the feedback information in a feedback packet as part of an uplink MU feedback transmission as part of the MU ranging measurement exchange session.

BRIEF DESCRIPTION OF THE DRAWINGS

FIG. 6C is an example format of a user information field within a trigger frame, according to an embodiment.

DETAILED DESCRIPTION

Frame formats for ranging measurement procedures and ranging measurement techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, ranging measurement techniques are utilized in other types of wireless communication systems such as personal area networks (PANs), mobile communication networks such as cellular networks, metropolitan area networks (MANs), etc.

Figure 1:
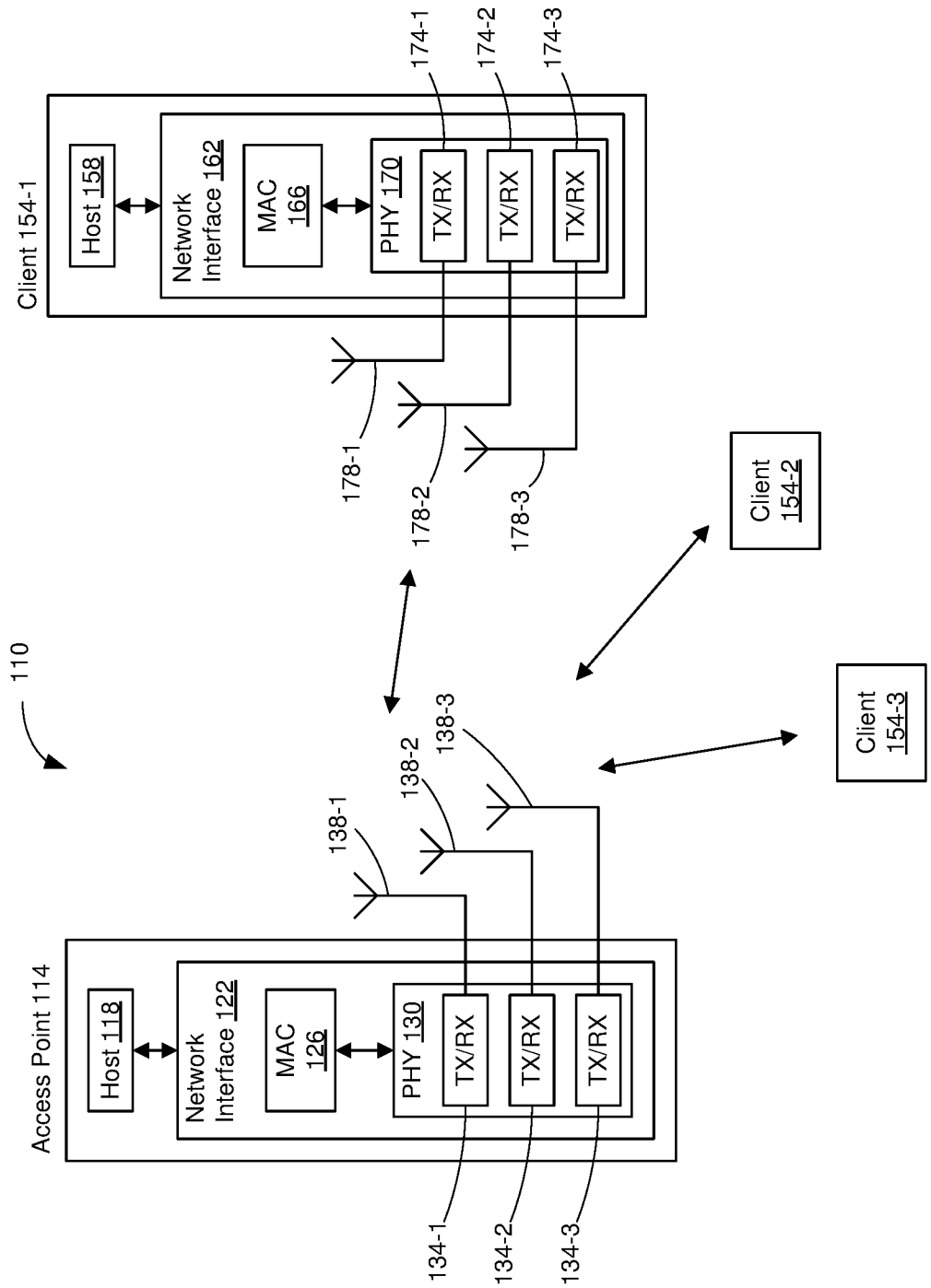
FIG. 1 is a block diagram of an example wireless local area network (WLAN), according to an embodiment.

FIG. 1 is a block diagram of an example WLAN 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

The PHY processor 130 is configured to downconvert one or more radio frequency (RF) signals received via the one or more antennas 138 to one or more baseband analog signals, and convert the analog baseband signal(s) to one or more digital baseband signals, according to an embodiment. The PHY processor 130 is further configured to process the one or more digital baseband signals to demodulate the one or more digital baseband signals and to generate a PPDU. The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

PPDUs are sometimes referred to herein as packets. MPDUs are sometimes referred to herein as frames.

Figure 2A:
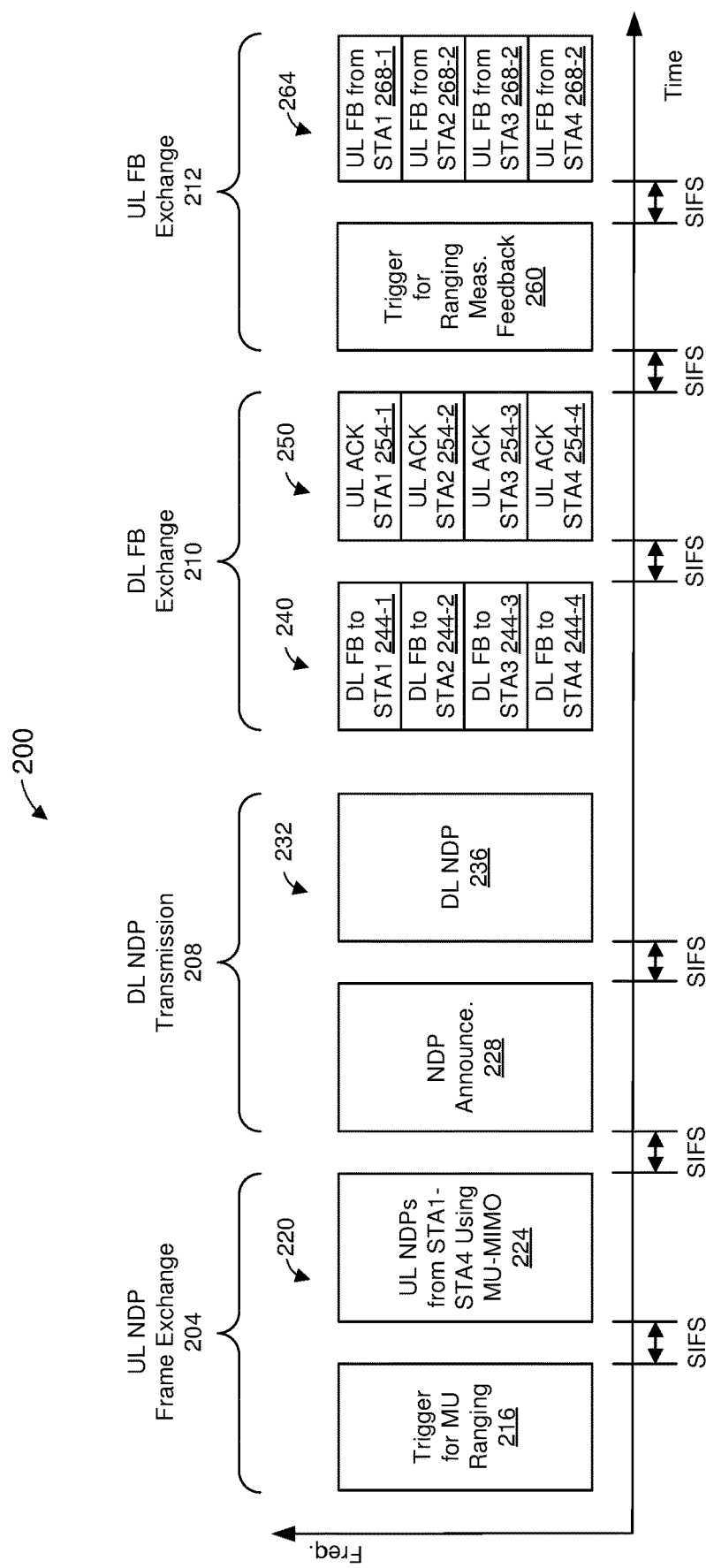
FIG. 2A is a diagram of an example multi-user (MU) ranging measurement exchange in an MU ranging measurement procedure, according to an embodiment.

FIG. 2A is a diagram of an example multi-user (MU) ranging measurement exchange 200 in an MU ranging measurement procedure, according to an embodiment. The diagram 200 is described in the context of the example network 110 merely for explanatory purposes. In some embodiments, signals illustrated in FIG. 2A are generated by other suitable communication devices in other suitable types of wireless networks.

The MU ranging measurement exchange 200 corresponds to an AP-initiated MU ranging measurement exchange, according to an embodiment. The MU ranging measurement exchange 200 includes an uplink (UL) null data packet (NDP) frame exchange 204, a downlink (DL) NDP transmission portion 208, a DL feedback (FB) frame exchange 210, and an UL FB frame exchange 212. In an embodiment, the uplink UL NDP frame exchange 204, the DL NDP transmission portion 208, the DL FB frame exchange 210, and the UL FB frame exchange 212 occur within a single transmit opportunity period (TXOP). In another embodiment, the uplink UL NDP frame exchange 204, the DL NDP transmission portion 208, the DL FB frame exchange 210, and the UL FB frame exchange 212 do not occur within a single TXOP. For example, the uplink UL NDP frame exchange 204 and the DL NDP transmission portion 208 occur within a single TXOP, whereas the DL FB frame exchange 210 and the UL FB frame exchange 212 occur after the single TXOP (e.g., in another TXOP or in multiple other TXOPs).

In the UL NDP exchange 204, a first communication device (e.g., the AP 114) transmits a DL PPDU 216 that includes a trigger frame to cause a group of multiple second communication devices (e.g., client stations 154) to simultaneously transmit, as part of an uplink (UL) MU transmission 220, UL null data packets (NDPs) 224. In an embodiment, the trigger frame in the PPDU 216 is a type of trigger frame specifically for initiating an MU ranging measurement exchange such as the MU ranging measurement exchange 200. The trigger frame in the PPDU 216 causes multiple client stations 154 to begin simultaneously transmitting the UL MU transmission 220 a defined time period after an end of the PPDU 216. In an embodiment, the defined time period is a short interframe space (SIFS) as defined by the IEEE 802.11 Standard. In other embodiments, another suitable time period is utilized.

In an embodiment, the UL MU transmission 220 includes an UL MU multiple input, multiple output (MIMO) transmission having two or more UL NDPs 224 from multiple client stations 154, e.g., STA1, STA2, STA3, and STA4. The two or more of the UL NDPs 224 are transmitted within a same frequency band via different spatial streams (e.g., MU-MIMO). In an embodiment in which the UL MU transmission includes an UL MU-MIMO transmission, the AP 114 uses a P matrix to demap the different NDPs from the different spatial streams. In another embodiment, the UL MU transmission 220 includes an UL orthogonal frequency division multiple access (OFDMA) transmission having two or more UL NDPs 224 from multiple client stations 154, e.g., STA1, STA2, STA3, and STA4, in different respective frequency bandwidth portions. In yet another embodiment, three or more UL NDP packets 224 transmitted using a combination of UL MU-MIMO and UL OFDMA, where at least two NDPs are transmitted using MU-MIMO in a same frequency bandwidth portion via different spatial streams, and at least one NDP is transmitted in at least one other different frequency bandwidth portion. The UL NDPs 224 include PHY preambles having one or more short training fields (STFs), one or more long training fields (LTFs) and one or more signal fields, in an embodiment. The UL NDPs 224 omit data portions.

When transmitting the UL NDPs 224, each client station 154 records a time $t_{1,k}$ at which the client station 154 began transmitting a particular portion of the UL NDP 224, where k is an index indicating the particular client station 154, e.g. the time at which the client station 154 began transmitting particular training fields in the UL NDP 224, e.g., HE-LTFs. Similarly, when the AP 114 receives each UL NDP 224, the AP 114 records a time $t_{2,k}$ at which the AP 114 began receiving a particular portion of the UL NDP 224, e.g. the time at which the AP 114 began receiving particular training fields in the UL NDP 224, e.g., HE-LTFs.

In some embodiments, when transmitting the UL NDPs 224, each of at least some of the client stations 154 (e.g., client stations 154 with multiple antennas 174) records an angle of departure, $AoD_{1,k}$ at which the UL NDP 224 left the antennas 178 of the client station 154. Similarly, when the AP 114 receives each UL NDP 224, the AP 114 records an angle of arrival, $AoA_{1,k}$, at which the UL NDP 224 arrived at the antennas 138 of the AP 114.

Figure 2B:
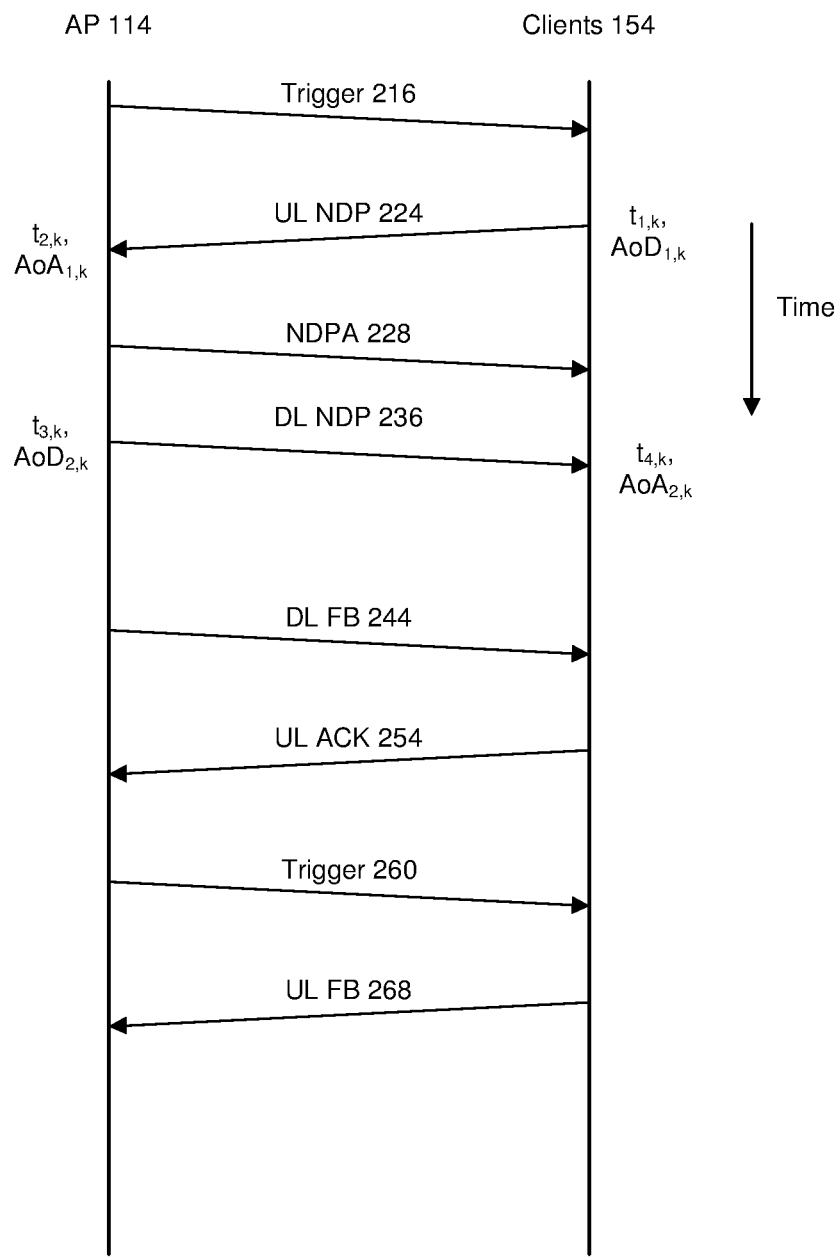
FIG. 2B is a timing diagram of the example MU ranging measurement exchange of FIG. 2A, according to an embodiment.

FIG. 2B is a timing diagram of the example MU ranging measurement exchange 200 of FIG. 2A. As illustrated in FIG. 2B, each client station 154 records the time $t_{1,k}$ at which the client station 154 began transmitting the UL NDP 224, and records the $AoD_{1,k}$ at which the UL NDP 224 left the antennas 178 of the client station 154. Additionally, the AP 114 records the time $t_{2,k}$ at which the AP 114 began receiving each UL NDP 224, and the $AoA_{1,k}$, at which each UL NDP 224 arrived at the antennas 138 of the AP 114.

Referring now to FIGS. 2A and 2B, responsive to the UL MU transmission 220, the AP 114 begins transmitting a DL PPDU 228 that includes an NDP announcement (NDPA) frame a defined time period after an end of the UL MU transmission 220. In an embodiment, the defined time period is SIFS. In other embodiments, another suitable time period is utilized. The NDPA frame in the PPDU 228 is configured to cause the client stations 154 to be prepared to receive an NDP from the AP 114, according to an embodiment.

The AP 114 generates a DL PPDU 232 and begins transmitting the DL PPDU 232 a defined time period after an end of the DL PPDU 228. In an embodiment, the defined time period is SIFS. In other embodiments, another suitable time period is utilized. The DL PPDU 232 is a MU PPDU that includes DL NDPs 236 to respective client stations 154. In another embodiment, the AP 114 transmits a single DL NDP 236 using a SU DL transmission (e.g., with a broadcast destination address) to the client stations 154, where all receiving STAs share a same group of HE LTF(s) for measurement. In another embodiment, the AP 114 transmits a single DL NDP 236 using a SU DL transmission (e.g., with a broadcast destination address) to the client stations 154, where each receiving client station 154 decodes a respective group of HE LTF(s) for a respective measurement. The DL NDP(s) 236 include PHY preamble(s) having one or more STFs, one or more LTFs and one or more signal fields, in an embodiment. The DL NDP(s) 236 omit data portions. In an embodiment, different DL NDPs 236 are transmitted in different frequency bandwidth portions (e.g., OFDMA). In some embodiments, two or more of the DL NDPs 236 are transmitted within a same frequency band (e.g., two or more of the DL NDPs 236 span the same frequency band) using different spatial streams (e.g., the two or more DL NDPs 236 are transmitted using MU-MIMO). In another embodiment, a single DL NDP 236 is broadcast to the client stations 154.

When transmitting the DL NDP(s) 236, the AP 114 records a time $t_{3,k}$ at which the AP 114 began transmitting a particular portion of the DL NDP(s) 236, e.g. the time at which the AP 114 began transmitting a particular training field portion in the DL NDP(s) 236, e.g., HE-LTFs. Similarly, when each client station 154 receives the corresponding DL NDP 236, the client station 154 records a time $t_{4,k}$ at which the client station 154 began receiving a particular portion of the DL NDP 236, e.g. the time at which the client station 154 began receiving particular training fields in the DL NDP 236, e.g., HE-LTFs. As illustrated in FIG. 2B, the AP 114 records the time $t_{3,k}$ at which the AP 114 began transmitting the DL NDP 236, and the client station 154 records the time $t_{4,k}$ at which the client station 154 began receiving the DL NDP 236.

In some embodiments, when transmitting the DL NDP 236, the AP 114 records an $AoD_{2,k}$ at which the DL NDP 236 left the antennas 138 of the AP 114. Similarly, when the client station 154 receives the DL NDP 236, the client station 154 records an $AoA_{2,k}$ at which the DL NDP 236 arrived at the antennas 178 of the client station 154.

In some embodiments, the MU ranging measurement exchange 200 omits the DL PPDU 228. For example, the AP 114 begins transmitting the DL PPDU 232 a defined time period after an end of the UL MU transmission 220. In an embodiment, the defined time period is SIFS. In other embodiments, another suitable time period is utilized.

The DL FB exchange 210 includes a DL PPDU 240 (which may be a DL OFDMA transmission or a DL MU-MIMO transmission) having FB frames 244 for multiple client stations 154, e.g., STA1, STA2, STA3, and STA4. The FB frames 244 are illustrated in FIG. 2A as being transmitted in different frequency bandwidth portions. In some embodiments, two or more of the FB frames 244 are transmitted within a same frequency band (e.g., two or more of the FB frames 244 span the same frequency band) using different spatial streams (e.g., the two or more FB frames 244 are transmitted using MU-MIMO).

In some embodiments, the DL PPDU 240 is transmitted a defined time period after an end of the DL PPDU 232. In an embodiment, the defined time period is SIFS. In other embodiments, another suitable time period is utilized. In other embodiments, the DL PPDU 240 is transmitted after some delay. As discussed above, in some embodiments, the DL PPDU 240 is not transmitted within a same TXOP as the DL PPDU 232.

The FB frames 244 respectively include the recorded times $t_{2,k}$ and $t_{3,k}$. In some embodiments, each of one or more FB frames 244 respectively includes the recorded angles $AoA_{1,k}$ and $AoD_{2,k}$. In some embodiments, the FB frames 244 optionally also include respective channel estimate information determined by the AP 114 based on reception of the UL NDPs 224.

After receipt of the FB frames 244, one or more of the client stations 154 respectively calculate one or more respective of times-of-flight between the AP 114 and the one or more client stations 154 using the recorded times $t_{1,k}$, $t_{2,k}$, $t_{3,k}$, and $t_{4,k}$, according to an embodiment. Any suitable technique, including currently known techniques, may be utilized to calculate a time-of-flight using the recorded times $t_{1,k}$, $t_{2,k}$, $t_{3,k}$, and $t_{4,k}$. Respective distances between the AP 114 and the client stations 154 may be calculated using the calculated times-of-flight, e.g., by respectively multiplying the times-of-flight by the speed of light, according to an embodiment.

In some embodiments, one or more of the client stations 154 calculates estimated positions of one or more of the client stations using the calculated times-of-flight. For example, the client station 154-1 uses triangulation techniques to calculate an estimated positions of the client station 154-1 using the calculated time-of-flight. In some embodiments, the client station 154-1 calculates an estimated position of the client station also using the recorded angles $AoD_{1,k}$, $AoA_{1,k}$, $AoD_{2,k}$, and $AoA_{2,k}$. For example, the recorded angles $AoD_{1,k}$, $AoA_{1,k}$, $AoD_{2,k}$, and $AoA_{2,k}$ are used as part of a triangulation algorithm for determining a position of the client station 154-1.

Responsive to receipt of the FB frames 244, the client stations 154 generate an UL MU transmission 250 (which may be an UL OFDMA transmission or an UL MU MIMO transmission) that includes respective ACK frames 254 from respective client stations, according to an embodiment. The client stations 154 transmit as part of the UL MU transmission 250 a defined time period after an end of the DL transmission 240. In an embodiment, the defined time period is SIFS. In other embodiments, another suitable time period is utilized. The ACK frames 254 are illustrated in FIG. 2A as being transmitted in different frequency bandwidth portions. In some embodiments, two or more of the ACK frames 254 are transmitted within a same frequency band (e.g., two or more of the ACK frames 254 span the same frequency band) using different spatial streams (e.g., the two or more ACK frames 254 are transmitted using MU-MIMO). In another embodiment, the client station 154 do not transmit ACK frames 254 even after receiving and correctly decoding the DL FB frame 244.

In an embodiment, the AP 114 transmits a DL PPDU 260 a defined time period after an end of the UL MU transmission 250. In an embodiment, the defined time period is SIFS. In other embodiments, another suitable time period is utilized. The PPDU 260 includes a trigger frame to cause the group of client stations 154 to simultaneously transmit, as part of an UL MU transmission 264, uplink PPDUs 268 that include ranging measurement feedback. The trigger frame in the PPDU 260 causes multiple client stations 154 to begin simultaneously transmitting the UL MU transmission 264 a defined time period after an end of the PPDU 260. In an embodiment, the defined time period is SIFS. In other embodiments, another suitable time period is utilized.

The UL MU transmission 264 (which may be an UL OFDMA transmission or an UL MU-MIMO transmission) includes UL PPDUs 268 from multiple client stations 154, e.g., STA1, STA2, STA3, and STA4. The UL PPDUs 268 are illustrated in FIG. 2A as being transmitted in different frequency bandwidth portions. In some embodiments, two or more of the UL PPDUs 268 are transmitted within a same frequency band (e.g., two or more of the UL PPDUs 268 span the same frequency band) using different spatial streams (e.g., the two or more UL PPDUs 268 are transmitted using MU-MIMO).

The UL PPDUs 268 correspond to uplink ranging measurement feedback packets. The PPDUs 268 respectively include the recorded times $t_{1,k}$ and $t_{4,k}$. In some embodiments, each of one or more PPDUs 268 respectively includes the recorded angles $AoD_{1,k}$ and $AoA_{2,k}$. In some embodiments, the PPDUs 268 optionally also include respective channel estimate information determined by the client station 154 based on reception of the DL NDP 236.

After receipt of the PPDUs 268, the AP 114 calculates respective of times-of-flight between the AP 114 and the client stations 154 using the recorded times $t_{1,k}$, $t_{2,k}$, $t_{3,k}$, and $t_{4,k}$, according to an embodiment. Any suitable technique, including currently known techniques, may be utilized to calculate a time-of-flight using the recorded times $t_{1,k}$, $t_{2,k}$, $t_{3,k}$, and $t_{4,k}$. Respective distances between the AP 114 and the client stations 154 may be calculated using the calculated times-of-flight, e.g., by respectively multiplying the times-of-flight by the speed of light, according to an embodiment.

In some embodiments, the AP 114 calculates estimated positions of one or more of the client stations using the calculated times-of-flight. For example, the AP 114 uses triangulation techniques to calculate estimated positions of one or more of the client stations using the calculated times-of-flight. In some embodiments, the AP 114 calculates estimated positions of one or more of the client stations also using the recorded angles $AoD_{1,k}$, $AoA_{1,k}$, $AoD_{2,k}$, and $AoA_{2,k}$. For example, the recorded angles $AoD_{1,k}$, $AoA_{1,k}$, $AoD_{2,k}$, and $AoA_{2,k}$ are used as part of a triangulation algorithm for determining positions of communication devices.

In other embodiments, each of one or more of the client stations 154 calculates a respective estimated position of the client station 154 using the calculated times-of-flight. For example, the client station 154 uses triangulation techniques to calculate an estimated position of the client station 154 using the calculated times-of-flight. In some embodiments, the client station 154 calculates an estimated position of the client station 154 also using the recorded angles $AoD_{1,k}$, $AoA_{1,k}$, $AoD_{2,k}$, and $AoA_{2,k}$. For example, the recorded angles $AoD_{1,k}$, $AoA_{1,k}$, $AoD_{2,k}$, and $AoA_{2,k}$ are used as part of a triangulation algorithm for determining a position of the client station 154.

In another embodiment, the order, in time, of the DL FB exchange 210 and the UL FB exchange 212 is reversed, and the UL FB exchange 212 occurs before the DL FB exchange 210. In some embodiments, the DL FB exchange 210 is omitted. In some embodiments, the UL FB exchange 212 is omitted.

As discussed above, DL FB PPDUs 244 may include, in addition to recorded times $t_{2,k}$ and $t_{3,k}$, one or more of i) the recorded angles $AoA_{1,k}$, ii) the recorded angles $AoD_{2,k}$, and iii) channel estimate information determined by the AP 114 based on reception of the UL NDPs 224. In some embodiments, channel estimate information can be conveyed in different granularities. For example, in some embodiments, one respective channel measurement is provided for each OFDM tone, or one respective channel measurement is provided for each group of n OFDM tones, where n is an integer greater than one. Sending one respective channel measurement for each group of n OFDM tones requires less total channel estimate information to be conveyed across the wireless channel medium, as opposed to sending one respective channel measurement for each OFDM tone. In some embodiments, a channel measurement can be quantized to different numbers of bits. For instance, a channel measurement can represented using m bits, where m is a positive integer chosen from a suitable set of different positive integers corresponding to different quantization granularities. Sending channel measurements that are each represented using m bits requires less total channel estimate information to be conveyed across the wireless channel medium, as opposed to sending channel measurements that are each represented using m+2 bits, for example. Thus, different granularities channel estimate information correspond to different value(s) of one or both of n and m, according to an embodiment.

In some embodiments, one or more client stations 154 (e.g., one or more MAC processors in the client stations 154 (e.g., the MAC processor 166)) determine that the AP 114 is to include, in one or more of the DL FB PPDUs 244, one or more of i) recorded angle(s) $AoA_{1,k}$, ii) recorded angle(s) $AoD_{2,k}$, and iii) channel estimate information determined by the AP 114 based on reception of the UL NDPs 224. In some embodiments, the AP 114 (e.g., the MAC processor 126) determines the granularity(ies) of channel estimate information to be included in one or more of the UL FB PPDUs 268. In some embodiments, one or more client stations 154 (e.g., one or more MAC processors in the client stations 154 (e.g., the MAC processor 166)) generates one or more MAC frames that include information configured to cause the AP 114 to include, in one or more of the DL FB PPDUs 244, one or more of i) recorded angle(s) $AoA_{1,k}$, ii) recorded angle(s) $AoD_{2,k}$, and iii) channel estimate information determined by the AP 114 based on reception of the UL NDPs 224. In some embodiments, contents of the sounding feedback, e.g., time stamp(s), AoA, AoD, channel estimation information, etc., is decided during an NDP sounding negotiation that occurs prior to the MU ranging measurement exchange 200.

Also as discussed above, UL FB PPDUs 268 may include, in addition to recorded times $t_{1,k}$ and $t_{4,k}$, one or more of i) the recorded angles $AoD_{1,k}$, ii) the recorded angles $AoA_{2,k}$, and iii) channel estimate information determined by client stations 154 based on reception of the DL NDP(s) 236.

In some embodiments, the AP 114 (e.g., the MAC processor 126) determines that one or more client stations 154 are to include, in one or more of the UL FB PPDUs 268, one or more of i) recorded angle(s) $AoD_{1,k}$, ii) recorded angle(s) $AoA_{2,k}$, and iii) channel estimate information determined by client station(s) 154 based on reception of the DL NDPs 236. In some embodiments, the AP 114 (e.g., the MAC processor 126) determines the granularity(ies) of channel estimate information to be included in one or more of the UL FB PPDUs 268. In some embodiments, the AP 114 (e.g., the MAC processor 126) generates one or more MAC frames that include information configured to cause one or more of the client stations 154 to include, in one or more of the UL FB PPDUs 268, one or more of i) recorded angle(s) $AoD_{1,k}$, ii) recorded angle(s) $AoA_{2,k}$, and iii) channel estimate information determined by client station(s) 154 based on reception of the DL NDPs 236. In some embodiments, contents of the sounding feedback, e.g., time stamp(s), AoA, AoD, channel estimation information, etc., is decided during an NDP sounding negotiation that occurs prior to the MU ranging measurement exchange 200. In some embodiments, contents of the sounding feedback is specified in a trigger frame (e.g., trigger frame included in PPDU 216 and/or PPDU 260) or an NDP Announcement frame (e.g., NDPA frame included in PPDU 228).

If the one or more of the client stations 154 are to include, in one or more of the UL FB PPDUs 268, channel estimate information, the one or more MAC frames may include information that indicates the granularity(ies) of the channel estimate information to be included in one or more of the UL FB PPDUs 268, according to some embodiments. The AP 114 then transmits the one or more MAC frames prior to the MU ranging measurement exchange 200. In some embodiments, granularity(ies) of the channel estimation information is decided during an NDP sounding negotiation that occurs prior to the MU ranging measurement exchange 300. In some embodiments, granularity(ies) of the channel estimation information is specified in a trigger frame (e.g., trigger frame included in PPDU 216 and/or PPDU 260) or an NDP Announcement frame (e.g., NDPA frame included in PPDU 228).

Figure 3A:
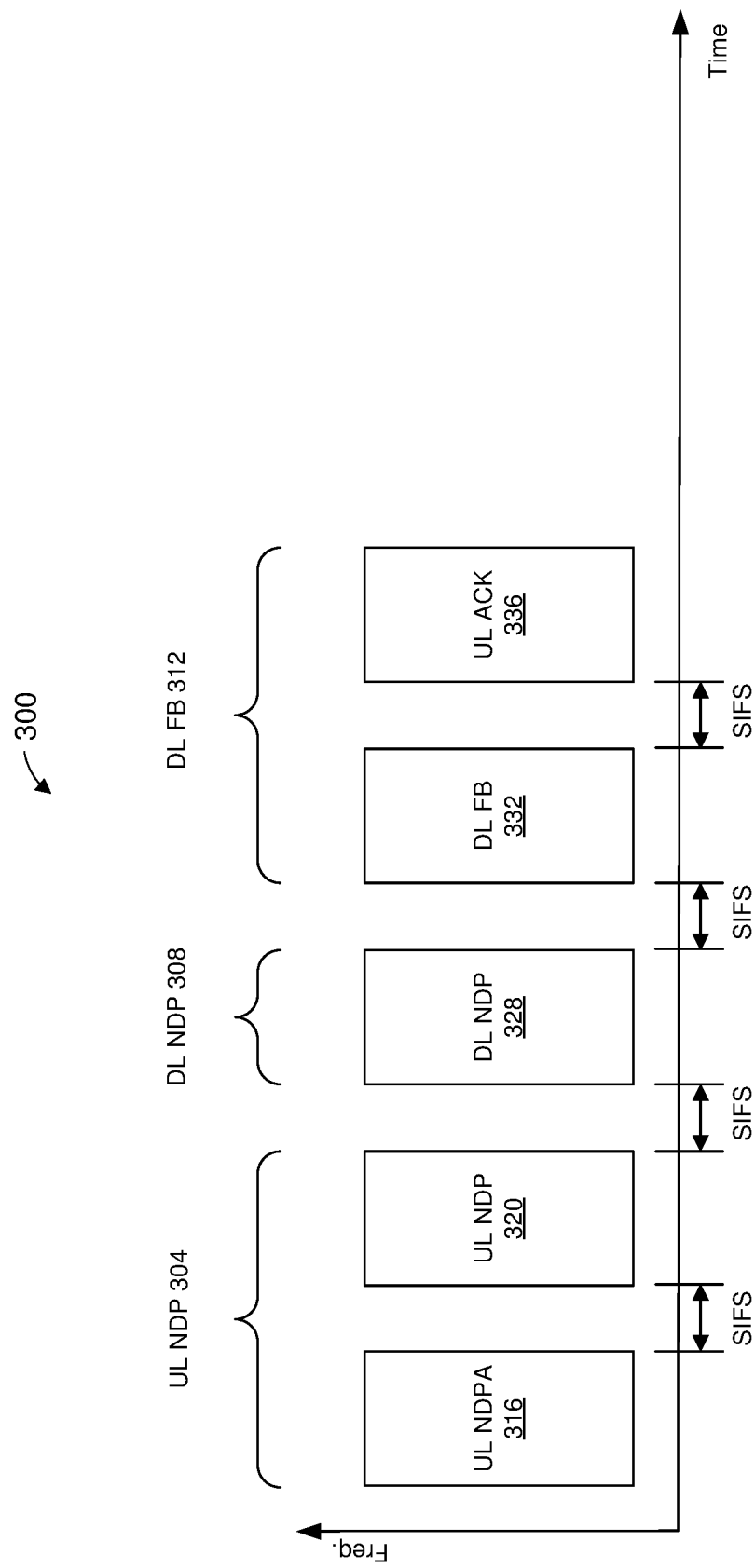
FIG. 3A is a diagram of an example single-user (SU) ranging measurement exchange in an SU ranging measurement procedure, according to an embodiment.

FIG. 3A is a diagram of an example single-user (SU) ranging measurement exchange 300 in an SU ranging measurement procedure, according to an embodiment. The diagram 300 is described in the context of the example network 110 merely for explanatory purposes. In some embodiments, signals illustrated in FIG. 3A are generated by other suitable communication devices in other suitable types of wireless networks.

The SU ranging measurement exchange 300 corresponds to a client-initiated SU ranging measurement exchange, according to an embodiment. The SU ranging measurement exchange 300 includes an UL NDP transmission portion 304, a DL NDP transmission portion 308, and a DL feedback transmission portion 312. In an embodiment, the uplink UL NDP transmission portion 304, the DL NDP transmission portion 308, and the DL feedback portion 312 occur within a single TXOP. In another embodiment, the uplink UL NDP transmission portion 304, the DL NDP transmission portion 308, and the DL feedback transmission portion 312 do not occur within a single TXOP. For example, the uplink UL NDP transmission portion 304 and the DL NDP transmission portion 308 occur within a single TXOP, whereas the DL feedback transmission portion 312 occurs outside of the single TXOP (e.g., in another TXOP).

In the UL NDP transmission portion 304, a first communication device (e.g., the client station 154) transmits a PPDU 316 that includes an SU UL NDPA having information indicating the initiation of an SU ranging measurement exchange. In an embodiment, the SU UL NDPA in the PPDU 316 is a type of NDPA frame specifically for initiating an SU ranging measurement exchange such as the SU ranging measurement exchange 300. The SU UL NDPA in the PPDU 316 causes the AP 114 to be ready to receive an NDP as part of an SU ranging measurement exchange.

The client station 154 then begins transmitting an NDP 320 a defined time period after an end of the PPDU 316. In an embodiment, the defined time period is SIFS. In other embodiments, another suitable time period is utilized.

The UL NDP 320 includes a PHY preamble having one or more STFs, one or more LTFs and one or more signal fields, in an embodiment. The UL NDP 320 omits a data portion.

When transmitting the UL NDP 320, the client station 154 records a time $t_1$ at which the client station 154 began transmitting a particular portion of the UL NDP 320, e.g. the time when the client station 154 began transmitting an HE/VHT LTF portion of the UL NDP 320. Similarly, when the AP 114 receives the UL NDP 320, the AP 114 records a time $t_2$ at which the AP 114 began receiving the particular portion of the UL NDP 320, e.g. the time when the client station 154 began AP 114 began receiving the HE/VHT LTF portion of the UL NDP 320.

In some embodiments, when transmitting the UL NDP 320, the client station 154 (e.g., a client station 154 with multiple antennas 174) records an angle of departure, $AoD_1$, at which the UL NDP 320 left the antennas 178 of the client station 154. Similarly, when the AP 114 receives the UL NDP 320, the AP 114 records an angle of arrival, $AoA_1$, at which the UL NDP 320 arrived at the antennas 138 of the AP 114. In some embodiment, after receiving the DL FB 312, the client station 154 transmits UL FB to the AP 114 for the AP 114 to calculate a range and/or position.

Figure 3B:
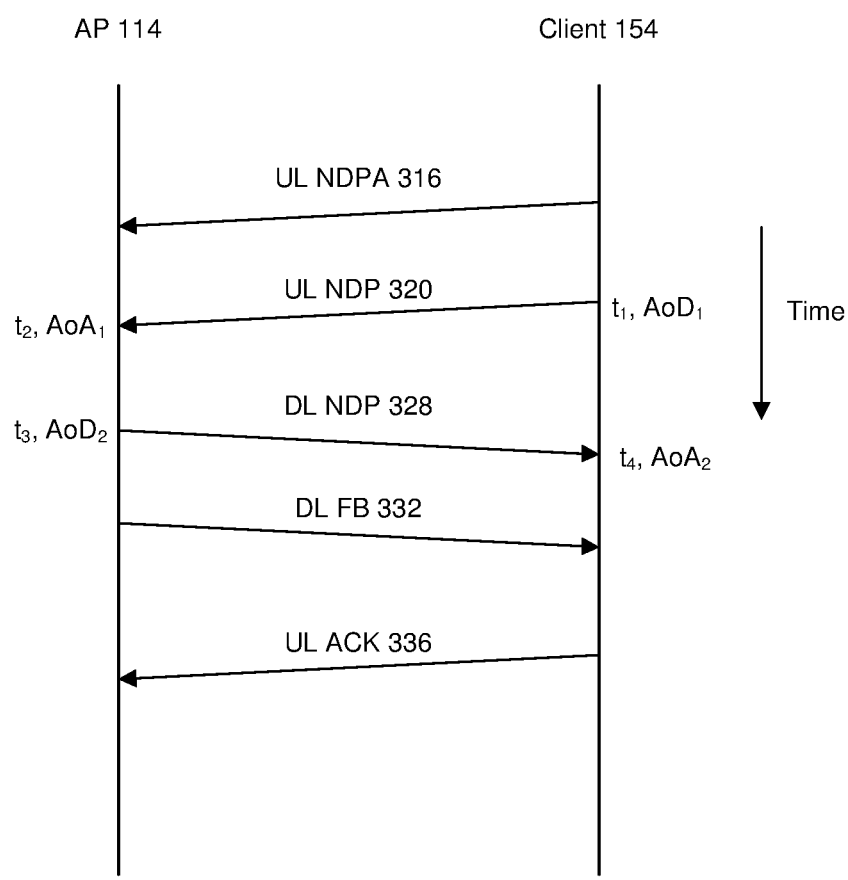
FIG. 3B is a timing diagram of the example SU ranging measurement exchange of FIG. 3A, according to the embodiment.

FIG. 3B is a timing diagram of the example MU ranging measurement exchange 300 of FIG. 3A. As illustrated in FIG. 3B, the client station 154 records the time $t_1$ at which the client station 154 began transmitting a particular portion of the UL NDP 320 (e.g. the time when the client station 154 began transmitting an HE/VHT LTF portion of the UL NDP 320), and records the $AoD_1$ at which the UL NDP 320 left the antennas 178 of the client station 154. Additionally, the AP 114 records the time $t_2$ at which the AP 114 began receiving the particular portion of the UL NDP 320 (e.g. the time when the client station 154 began transmitting an HE/VHT LTF portion of the UL NDP 320), and the $AoA_1$, at which each UL NDP 320 arrived at the antennas 138 of the AP 114.

Referring now to FIGS. 3A and 3B, the AP 114 generates a DL NDP 328 and, responsive to the UL NDP 320, the AP 114 begins transmitting the DL NDP 328 a defined time period after an end of the UL NDP 320. In an embodiment, the defined time period is SIFS. In other embodiments, another suitable time period is utilized. The DL NDP 328 includes a PHY preamble having one or more STFs, one or more LTFs and one or more signal fields, in an embodiment. The DL NDP 328 omits a data portion.

When transmitting the DL NDP 328, the AP 114 records a time $t_3$ at which the AP 114 began transmitting a particular portion of the DL NDP 328, e.g. the time when the AP 114 began transmitting an HE/VHT LTF portion of the DL NDP 328. Similarly, when the client station 154 receives the DL NDP 328, the client station 154 records a time $t_4$ at which the client station 154 began receiving the particular portion of the DL NDP 328, e.g. the time when the client station 154 began receiving the HE/VHT LTF portion of the DL NDP 328. As illustrated in FIG. 3B, the AP 114 records the time $t_3$ at which the AP 114 began transmitting the particular portion of the DL NDP 328 (e.g. the time when the AP 114 began transmitting an HE/VHT LTF portion of the DL NDP 328), and the client station 154 records the time $t_4$ at which the client station 154 began receiving the DL NDP 328 (e.g. the time when the client station 154 began receiving the HE/VHT LTF portion of the DL NDP 328).

In some embodiments, when transmitting the DL NDP 328, the AP 114 records an $AoD_2$ at which the DL NDP 328 left the antennas 138 of the AP 114. Similarly, when the client station 154 receives the DL NDP 328, the client station 154 records an $AoA_2$ at which the DL NDP 328 arrived at the antennas 178 of the client station 154.

In another embodiment, responsive to the UL NDP 320, the AP 114 begins transmitting a DL PPDU (not shown) that includes an NDPA frame a defined time period after an end of the UL NDP 320. In an embodiment, the defined time period is SIFS. In other embodiments, another suitable time period is utilized. The NDPA frame is configured to cause the client stations 154 to be prepared to receive the DL NDP 328 from the AP 114, according to an embodiment. The AP 114 then begins transmitting the DL NDP 328 a defined time period after an end of the DL PPDU that includes the NDPA frame. In an embodiment, the defined time period is SIFS. In other embodiments, another suitable time period is utilized.

In an embodiment, the AP 114 transmits a DL PPDU 332 a defined time period after an end of the DL NDP 328. In an embodiment, the defined time period is SIFS. In other embodiments, another suitable time period is utilized. The DL PPDU 332 corresponds to a downlink ranging measurement feedback packet that includes a FB frame. The FB frame in the DL PPDU 332 includes the recorded times $t_2$ and $t_3$. In some embodiments, the FB frame in the DL PPDU 332 respectively includes the recorded angles $AoA_1$ and $AoD_2$. In some embodiments, the FB frame in the DL PPDU 332 optionally also includes respective channel estimate information determined by the AP 114 based on reception of the UL NDP 1120.

After receipt of the DL PPDU 332, the client station 154 calculates a time-of-flight between the AP 114 and the client station 154 using the recorded times $t_1$, $t_2$, $t_3$, and $t_4$, according to an embodiment. Any suitable technique, including currently known techniques, may be utilized to calculate a time-of-flight using the recorded times $t_1$, $t_2$, $t_3$, and $t_4$. A distance between the AP 114 and the client station 154 may be calculated using the calculated times-of-flight, e.g., by respectively multiplying the times-of-flight by the speed of light, according to an embodiment.

In some embodiments, the client station 154 calculates an estimated position of the client station using the calculated time-of-flight. For example, the client station 154 uses triangulation techniques to calculate an estimated position of the client station 154 using the calculated time-of-flight. In some embodiments, the client station 154 calculates an estimated positions of the client station also using the recorded angles $AoD_1$, $AoA_1$, $AoD_2$, and $AoA_2$. For example, the recorded angles $AoD_1$, $AoA_1$, $AoD_2$, and $AoA_2$ are used as part of a triangulation algorithm for determining positions of communication devices.

Responsive to receipt of the DL PPDU 332, the client station 154 generates an UL PPDU 336 that includes an ACK frame, according to an embodiment. The client station 154 transmits the UL PPDU 336 a defined time period after an end of the DL PPDU 332. In an embodiment, the defined time period is SIFS. In other embodiments, another suitable time period is utilized.

In some embodiments, the DL feedback PPDU 332 is in a single TXOP with the UL NDP transmission portion 304 and the DL NDP transmission portion 308, but includes feedback information for another SU ranging measurement exchange (not shown) that occurred prior to the UL NDP transmission portion 304 and the DL NDP transmission portion 308.

The client station 154 does not generate and transmit the UL PPDU 336 even when the client station 154 successfully receives the DL PPDU 332, according to an embodiment. Thus, in some embodiments, the UL PPDU 336 is omitted from the procedure 300. For example, if the network interface device 162 determines (e.g., the MAC processor 166 determines) that the network interface device 162 did not successfully receive the FB frame in the PPDU 332, the network interface device 162 determines (e.g., the MAC processor 166 determines) that the SU ranging measurement exchange 300 is to be repeated.

As discussed above, the FB frame in the PPDU 332 may include, in addition to recorded times $t_2$ and $t_3$, one or more of i) the recorded angles $AoA_1$, ii) the recorded angles $AoD_2$, and iii) channel estimate information determined by the AP 114 based on reception of the UL NDP 320.

In some embodiments, the AP 114 (e.g., the MAC processor 126) determines which feedback information is to be included in the PPDU 332 (e.g., one or more of i) recorded angle $AoA_1$, ii) recorded angle $AoD_2$, and iii) channel estimate information determined by the AP 114 based on reception of the UL NDP 320. In some embodiments, the AP 114 (e.g., the MAC processor 126) determines the granularity of channel estimate information to be included in the DL FB PPDU 332.

In some embodiments, the client station 154 (e.g., the MAC processor 166) determines which information (e.g., the recorded angle $AoA_1$, the recorded angle $AoD_2$, channel estimate information, channel estimate information at a particular granularity, etc.) the AP 114 should include within the DL FB PPDU 332. In some embodiments, the client station 154 includes an indication(s) of the requested information in the UL NDPA in the PPDU 316. Upon receiving the UL NDPA in the PPDU 316, the AP 114 determines which information to include in the DL FB PPDU 332.

In some embodiments, the client station 154 (e.g., the MAC processor 166) generates one or more MAC frames that include information configured to cause the AP 114 to include, in the DL FB PPDU 332, the requested information. The client station 154 then transmits the one or more MAC frames prior to the SU ranging measurement exchange 300. Upon receiving the one or more MAC frames prior to the SU ranging measurement exchange 300, the AP 114 determines which information to include in the DL FB PPDU 332.

In some embodiments, the AP 114 and the client station 154 negotiate whether the AP 114 is to include, in the DL FB PPDU 332, one or more of i) the recorded angle $AoA_1$, ii) the recorded angle $AoD_2$, iii) channel estimate information, and/or iv) the granularity of the channel estimate information prior to the SU ranging measurement exchange 300. For example, in an embodiment, negotiating includes the client station 154 (e.g., the MAC processor 166) generating one or more MAC frames with information indicating requested types of information to be included and/or requested granularities, and the client station 154 transmits the one or more MAC frames to the AP 114 prior to the SU ranging measurement exchange 300. Similarly, in an embodiment, negotiating includes the AP 114 (e.g., the MAC processor 126) generating one or more MAC frames with information indicating proposed types of information to be included and/or requested granularities, and the AP 114 transmits the one or more MAC frames to the client station 154 prior to the SU ranging measurement exchange 300.

In an embodiment, the DL FB PPDU 332 is not transmitted the defined time period after the DL NDP 328, but rather a delay occurs between the DL NDP 328 and the DL FB portion 312.

Although FIG. 3 was described in the context of a ranging measurement exchange between the client station 154 and the AP 114, a similar ranging measurement exchange is performed between two client stations 154, in an embodiment. Similarly, the roles of the client station 154 and the AP 114 in the ranging measurement exchange 300 are reversed, in another embodiment.

Figure 4:
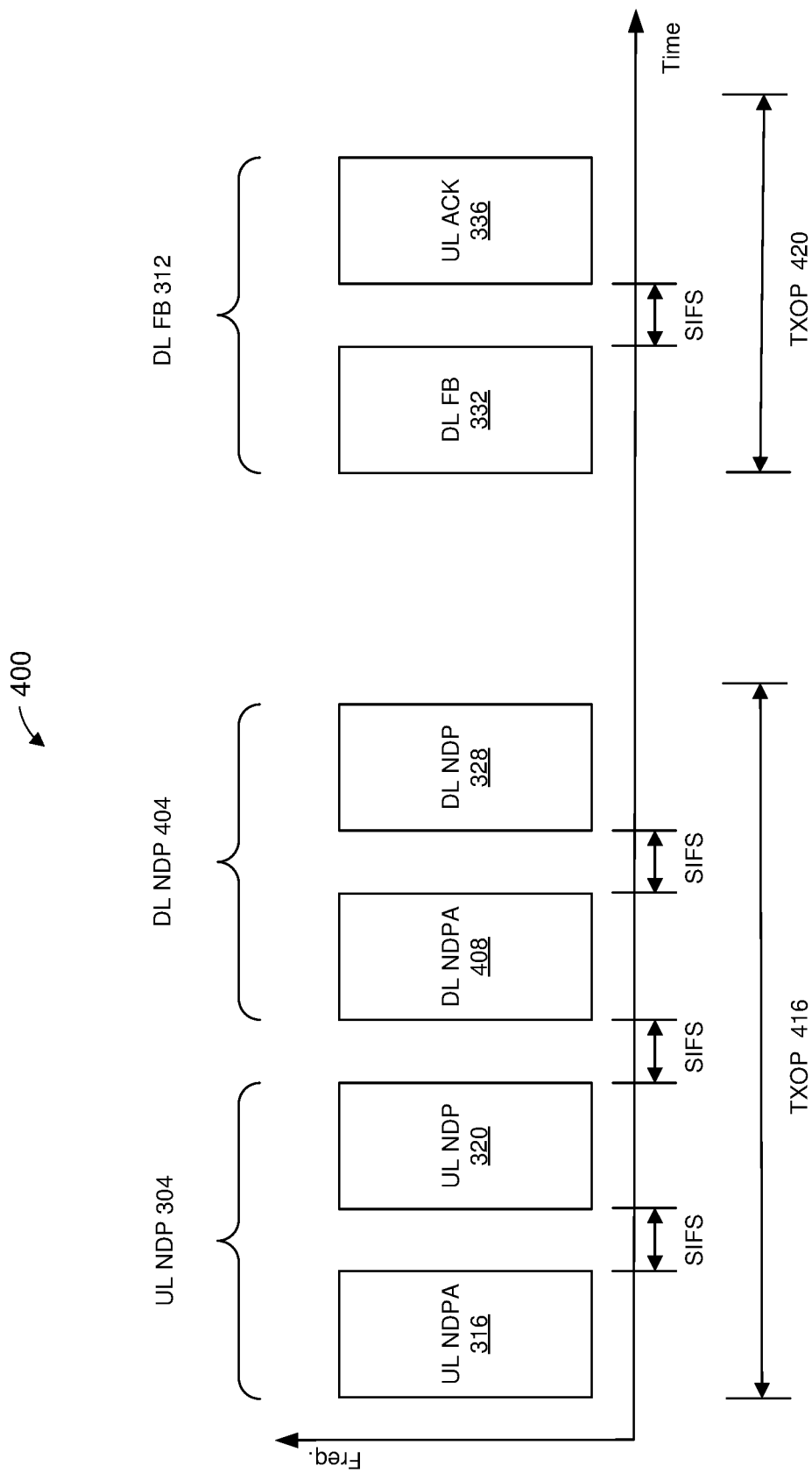
FIG. 4 is a diagram of another example SU ranging measurement exchange in an SU ranging measurement procedure, according to an embodiment.

FIG. 4 is a diagram of another example SU ranging measurement exchange 400 in another SU ranging measurement procedure, according to an embodiment. The diagram 400 is described in the context of the example network 110 merely for explanatory purposes. In some embodiments, signals illustrated in FIG. 4 are generated by other suitable communication devices in other suitable types of wireless networks.

The SU ranging measurement exchange 400 corresponds to a client station-initiated SU ranging measurement exchange, according to an embodiment. The SU ranging measurement exchange 400 is similar to the SU ranging measurement exchange 300 of FIG. 3A, but the DL FB portion 312 does not begin SIFS after the DL NDP 328 as in the SU ranging measurement exchange 300 of FIG. 3A. Additionally, a DL NDP portion 404 includes a DL PPDU 408 having a DL NDPA. The AP 114 begins transmitting the DL PPDU 408 a defined time period (e.g., SIFS or another suitable time period) after an end of the UL NDP 320. The AP 114 begins transmitting the DL NDP 328 a defined time period (e.g., SIFS or another suitable time period) after an end of the DL PPDU 408. In an embodiment, the PPDU 408 having the DL NDPA is omitted.

In an embodiment, the UL NDP portion 304 and the DL NDP portion 404 occur within a first TXOP 416, whereas the DL FB portion 312 occurs within a second TXOP 420.

In some embodiments, the client station 154 does not transmit the UL ACK PPDU 336 even when the client station 154 successfully receives the DL FB PPDU 332, according to an embodiment. Thus, in some embodiments, the UL ACK PPDU 336 is omitted from the procedure 400.

Figure 5:
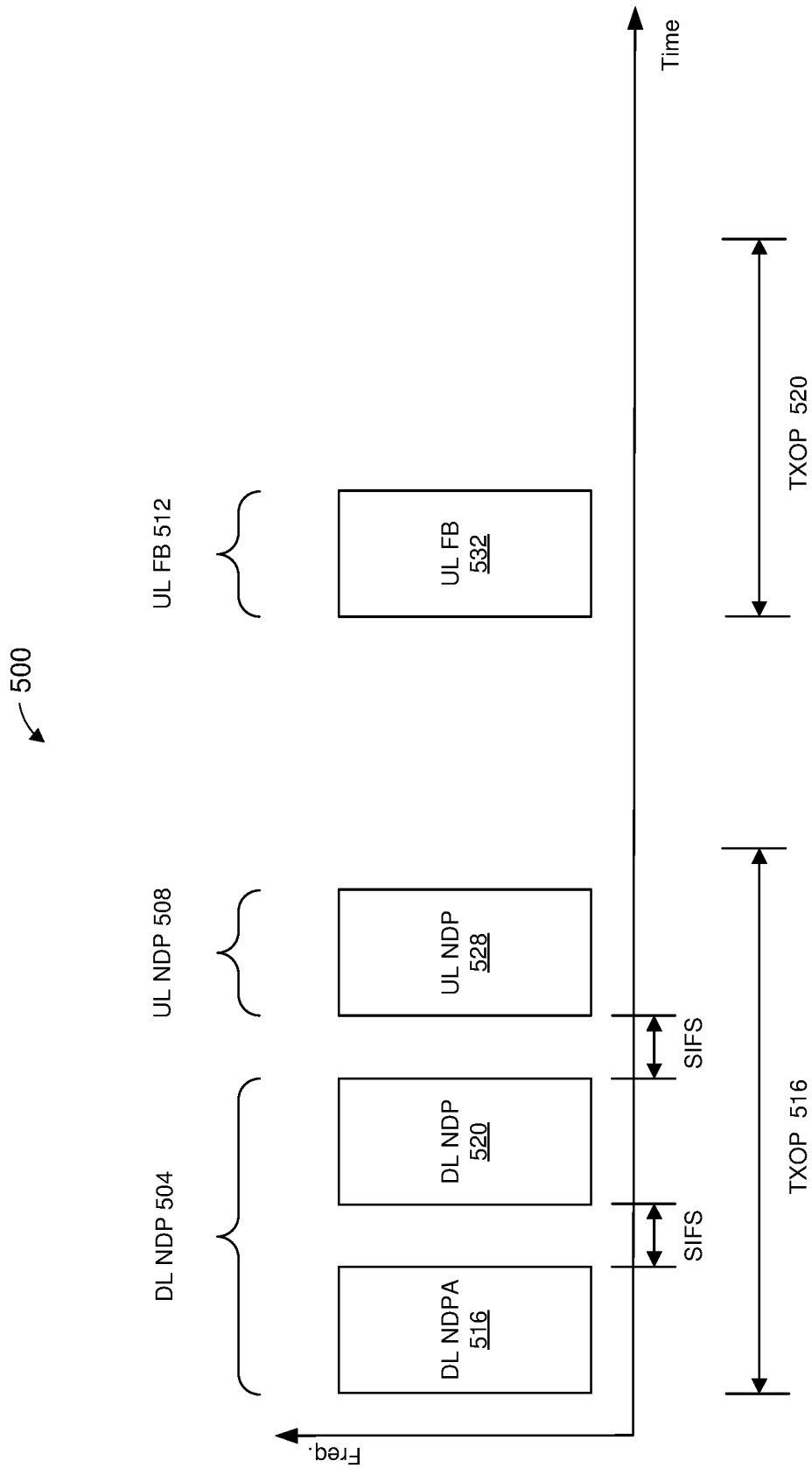
FIG. 5 is a diagram of another example SU ranging measurement exchange in an SU ranging measurement procedure, according to an embodiment.

FIG. 5 is a diagram of an example SU ranging measurement exchange 500 in an SU ranging measurement procedure, according to another embodiment. The diagram 500 is described in the context of the example network 110 merely for explanatory purposes. In some embodiments, signals illustrated in FIG. 5 are generated by other suitable communication devices in other suitable types of wireless networks.

The SU ranging measurement exchange 500 corresponds to an AP-initiated SU ranging measurement exchange, according to an embodiment. The SU ranging measurement exchange 500 includes a DL NDP transmission portion 504, an UL NDP transmission portion 508, and an UL feedback transmission portion 512. In an embodiment, the DL NDP transmission portion 504 and the UL NDP transmission portion 508 occur within a TXOP 516, and the UL FB portion 512 occurs with another TXOP 520.

In the DL NDP transmission portion 504, a first communication device (e.g., the AP 114) transmits a PPDU 516 that includes an SU DL NDPA having information indicating the initiation of an SU ranging measurement exchange. In an embodiment, the SU DL NDPA in the PPDU 516 is a type of NDPA frame specifically for initiating an SU ranging measurement exchange such as the SU ranging measurement exchange 500. The SU DL NDPA in the PPDU 516 causes a second communication device (e.g., the client station 154-1) to be ready to receive an NDP as part of an SU ranging measurement exchange.

The AP 114 then begins transmitting a DL NDP 520 a defined time period after an end of the PPDU 516. In an embodiment, the defined time period is SIFS. In other embodiments, another suitable time period is utilized.

The DL NDP 520 includes a PHY preamble having one or more STFs, one or more LTFs and one or more signal fields, in an embodiment. The DL NDP 520 omits a data portion.

When transmitting the DL NDP 520, the AP 114 records a time $t_1$ at which the AP 114 began transmitting the DL NDP 520. Similarly, when the client station 154-1 receives the DL NDP 520, the client station 154-1 records a time $t_2$ at which the client station 154-1 began receiving the DL NDP 520.

In some embodiments, when transmitting the DL NDP 520, the AP 114 records an angle of departure, $AoD_1$, at which the DL NDP 520 left the antennas 138 of the AP 114. Similarly, when the client station 154-1 receives the DL NDP 520, the client station 154-1 records an angle of arrival, $AoA_1$, at which the DL NDP 520 arrived at the antennas 178 of the client station 154-1.

The client station 154-1 generates an UL NDP 528 and, responsive to the DL NDP 520, the client station 154-1 begins transmitting the UL NDP 528 a defined time period after an end of the DL NDP 520. In an embodiment, the defined time period is SIFS. In other embodiments, another suitable time period is utilized. The UL NDP 528 includes a PHY preamble having one or more STFs, one or more LTFs and one or more signal fields, in an embodiment. The UL NDP 528 omits a data portion.

When transmitting the UL NDP 528, the client station 154-1 records a time $t_3$ at which the client station 154-1 began transmitting the UL NDP 528. Similarly, when the AP 114 receives the UL NDP 528, the AP 114 records a time $t_4$ at which the AP 114 began receiving the UL NDP 528.

In some embodiments, when transmitting the UL NDP 528, the client station 154-1 records an $AoD_2$ at which the UL NDP 528 left the antennas 178 of the client station 154-1. Similarly, when the AP 114 receives the UL NDP 528, the AP 114 records an $AoA_2$ at which the UL NDP 528 arrived at the antennas 138 of the AP 114.

In another embodiment, responsive to the DL NDP 520, the client station 154-1 begins transmitting an UL PPDU (not shown) that includes an NDPA frame a defined time period after an end of the DL NDP 520. In an embodiment, the defined time period is SIFS. In other embodiments, another suitable time period is utilized. The NDPA frame is configured to cause the AP 114 to be prepared to receive the UL NDP 528 from the client station 154-1, according to an embodiment. The client station 154-1 then begins transmitting the UL NDP 528 a defined time period after an end of the UL PPDU that includes the NDPA frame. In an embodiment, the defined time period is SIFS. In other embodiments, another suitable time period is utilized.

In an embodiment, the client station 154-1 transmits an UL PPDU 532 during the TXOP 520. The PPDU 532 corresponds to an uplink ranging measurement feedback packet. The PPDU 532 includes the recorded times $t_2$ and $t_3$. In some embodiments, the PPDU 532 respectively includes the recorded angles $AoA_1$ and $AoD_2$. In some embodiments, the PPDU 532 optionally also includes respective channel estimate information determined by the client station 154-1 based on reception of the DL NDP 520.

After receipt of the PPDU 532, the AP 114 calculates a time-of-flight between the AP 114 and the client station 154 using the recorded times $t_1$, $t_2$, $t_3$, and $t_4$, according to an embodiment. Any suitable technique, including currently known techniques, may be utilized to calculate a time-of-flight using the recorded times $t_1$, $t_2$, $t_3$, and $t_4$. A distance between the AP 114 and the client station 154 may be calculated using the calculated times-of-flight, e.g., by respectively multiplying the times-of-flight by the speed of light, according to an embodiment.

In some embodiments, the AP 114 calculates an estimated position of the client station 154 using the calculated time-of-flight. For example, the AP 114 uses triangulation techniques to calculate an estimated position of the client station 154 using the calculated time-of-flight. In some embodiments, the AP 114 calculates an estimated position of the client station 154 also using the recorded angles $AoD_1$, $AoA_1$, $AoD_2$, and $AoA_2$. For example, the recorded angles $AoD_1$, $AoA_1$, $AoD_2$, and $AoA_2$ are used as part of a triangulation algorithm for determining positions of communication devices.

Responsive to receipt of the PPDU 532, the AP 114 generates a DL PPDU (not shown) that includes an ACK frame, according to an embodiment. The AP 114 transmits the DL PPDU that includes the ACK frame a defined time period after an end of the UL PPDU 332. In an embodiment, the defined time period is SIFS. In other embodiments, another suitable time period is utilized. In another embodiment, the AP 114 does not generate and transmit the DL PPDU that includes the ACK frame even when the AP 114 successfully receives the UL PPDU 532, according to an embodiment. Thus, in some embodiments, the DL PPDU that includes the ACK frame is omitted from the procedure 500.

As discussed above, the UL FB in the PPDU 532 may include, in addition to recorded times $t_2$ and $t_3$, one or more of i) the recorded angles $AoA_1$, ii) the recorded angles $AoD_2$, and iii) channel estimate information determined by the client station 154-1 based on reception of the DL NDP 520.

In some embodiments, the AP 114 (e.g., the MAC processor 126) determines which information (e.g., the recorded angle $AoA_1$, the recorded angle $AoD_2$, channel estimate information, channel estimate information at a particular granularity, etc.) the client station 154-1 should include within the UL FB PPDU 532. In some embodiments, the AP 114 includes an indication(s) of the requested information in the DL NDPA in the PPDU 516. Upon receiving the DL NDPA in the PPDU 516, the client station 154-1 determines which information to include in the UL FB PPDU 532.

In some embodiments, the AP 114 (e.g., the MAC processor 136) generates one or more MAC frames that include information configured to cause the client station 154-1 to include, in the UL FB PPDU 532, the requested information. The AP 114 then transmits the one or more MAC frames prior to the SU ranging measurement exchange 500. Upon receiving the one or more MAC frames prior to the SU ranging measurement exchange 500, the client station 154-1 determines which information to include in the DL FB PPDU 532.

In some embodiments, the AP 114 and the client station 154 negotiate whether the client station 154-1 is to include, in the DL FB PPDU 532, one or more of i) the recorded angle $AoA_1$, ii) the recorded angle $AoD_2$, iii) channel estimate information, and/or iv) the granularity of the channel estimate information prior to the SU ranging measurement exchange 500. For example, in an embodiment, negotiating includes the AP 114 (e.g., the MAC processor 126) generating one or more MAC frames with information indicating requested types of information to be included and/or requested granularities, and the AP 114 transmits the one or more MAC frames to the client station 154-1 prior to the SU ranging measurement exchange 500. Similarly, in an embodiment, negotiating includes the client station 154-1 (e.g., the MAC processor 166) generating one or more MAC frames with information indicating proposed types of information to be included and/or requested granularities, and the client station 154-1 transmits the one or more MAC frames to the AP 114 prior to the SU ranging measurement exchange 500.

Although FIG. 5 was described in the context of a ranging measurement exchange between the client station 154 and the AP 114, a similar ranging measurement exchange is performed between two client stations 154, in an embodiment. Similarly, the roles of the client station 154 and the AP 114 in the ranging measurement exchange 500 are reversed, in another embodiment.

Figure 6A:
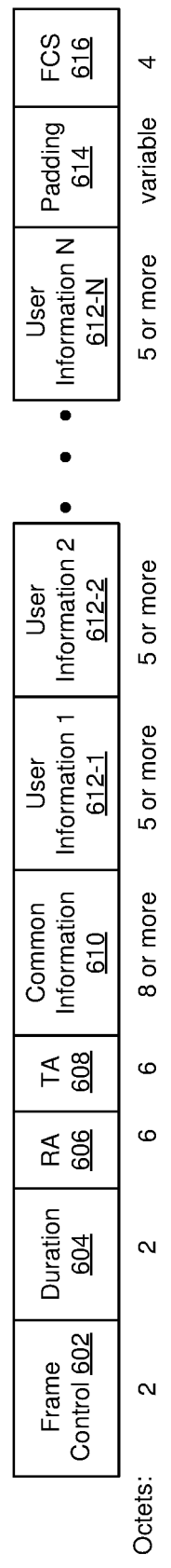
FIG. 6A is an example frame format of a trigger frame, according to an embodiment.

FIG. 6A is a diagram of an example frame format of a trigger frame 600 for use in an MU ranging measurement exchange, according to an embodiment. Referring now to FIG. 2A, the trigger frame 600 is the trigger frame included in the PPDU 216 in the UL NDP frame exchange 204, according to an embodiment. In an embodiment, the trigger frame 600 is generated by the MAC processor 126 of the network interface 122. FIG. 6A indicates example lengths (e.g., in terms of octets) of fields of the trigger frame 600. In other embodiments, length(s) one or more of the fields has another suitable number length. In some embodiments, one or more of the fields are omitted and/or one or more additional fields are included.

The trigger frame 600 includes a frame control field 602, a duration field 604, a receiver address (RA) field 606, a transmitter address (TA) field 608, a common information field 610, multiple user information fields 612, a padding field 614 and a frame check sequence (FCS) field 616.

The frame control field 602 includes information that indicates that frame 600 is a trigger frame configured to prompt a plurality of other communication devices to simultaneously transmit as part of an uplink MU transmission (e.g., OFDMA and/or MU-MIMO). The duration field 604 includes information that indicates a length of a transmit opportunity period (TXOP) during which the MU ranging measurement exchange will take place, in an embodiment. The RA field 606 includes an address corresponding to the multiple client stations 154 that are the target recipients of the trigger frame 600. For instance, the RA field 606 indicates a broadcast address or a multicast address corresponding to the multiple client stations 154, in various embodiments. The TA field 608 includes an address corresponding to the AP 114 transmitting the trigger frame 600. The common information field 610 includes information that is common to the multiple client stations 154. Each of the user information fields 612 includes information specific to a corresponding client station 154. For instance, in an embodiment, the user information field 1 612-1 indicates information specific to client station 154-1, the user information field 2 612-2 indicates information specific to client station 154-2, etc. The padding field 614 includes padding bits for the trigger frame 600, if any. The FCS field 616 includes an error detecting code that enables a receiving device to determine whether the trigger frame 600 was received without any errors.

Figure 6B:
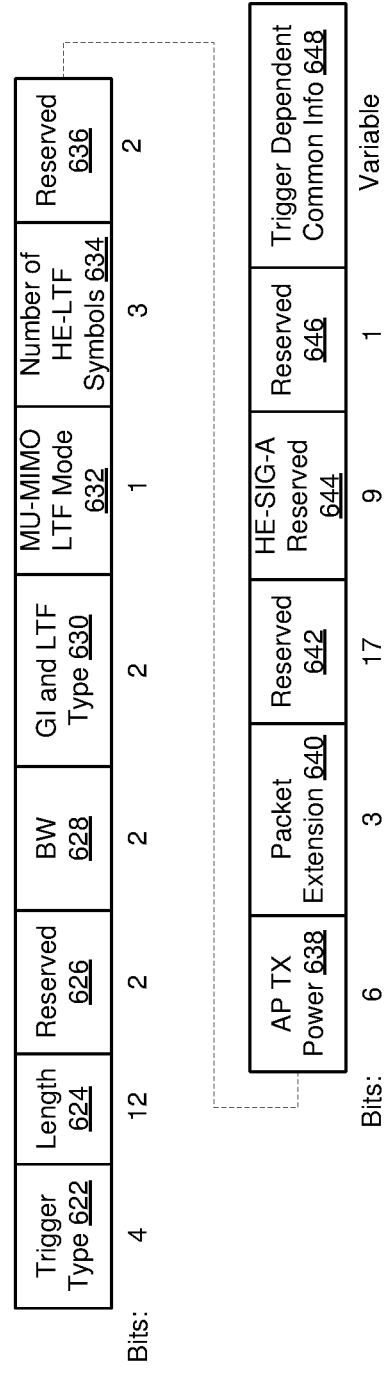
FIG. 6B is an example format of a common information field within a trigger frame, according to an embodiment.

FIG. 6B is a diagram of an example format of the common information field 610 of the trigger frame 600, according to an embodiment. FIG. 6B indicates example lengths (e.g., in bits) of subfields of the common information field 610. In other embodiments, one or more of the subfields has another suitable length. In some embodiments, one or more of the subfields are omitted and/or one or more additional subfields are included.

The common information field 610 includes a trigger type subfield 622, a length subfield 624, a bandwidth (BW) subfield 628, a guard interval (GI) and long training field (LTF) type subfield 630, an MU-MIMO LTF mode subfield 632, a number of high efficiency long training field (HE-LTF) symbols subfield 634, an AP transmit power subfield 638, a packet extension subfield 640, a high efficiency signal-A (HE-SIG-A) reserved subfield 644, a trigger dependent common information subfield 648, and reserved subfields 626, 636, 642, and 646. In an embodiment, the trigger dependent common information subfield 648 is omitted from the common information field 610.

The trigger type subfield 622 includes information indicating that the trigger frame 600 is a type of trigger frame specifically for initiating an MU ranging measurement exchange, such as the MU ranging measurement exchange 200, and/or specifically for prompting client stations 154 to transmit NDPs as part of an UL MU-MIMO transmission for an MU ranging measurement exchange such as the MU ranging measurement exchange 200. In an embodiment, the value of the trigger type subfield 622 is selected from among a plurality of values corresponding to a plurality of trigger variants defined by a communication protocol (e.g., the IEEE 802.11 Standard). Different trigger variants correspond to different type of information being solicited in an UL MU transmission and/or the UL MU transmission being part of different types of procedures, in some embodiments. In an illustrative embodiment, the plurality of trigger variants defined by the communication protocol include any suitable combination of two or more of the following: i) a basic trigger for soliciting an UL MU transmission having basic user data from communication devices, ii) a beamforming report poll trigger for soliciting an UL MU transmission having beamforming training feedback from communication devices, iii) an MU request-to-send trigger for soliciting an UL MU transmission having clear-to-send (CTS) frames from communication devices, iv) a buffer status report poll (BSRP) trigger for soliciting an UL MU transmission having information regarding how much user data communication devices have to send to the AP 114, v) an EFTM trigger for initiating an MU ranging measurement exchange, such as the MU ranging measurement exchange 200, and/or specifically for soliciting an UL MU-MIMO transmission of NDPs for an MU ranging measurement exchange such as the MU ranging measurement exchange 200, etc.

The length subfield 624 includes a value indicating a length the NDPs to be transmitted in the UL MU-MIMO transmission responsive to the trigger frame 660. In an embodiment, the value of the length subfield 624 corresponds to a value that client stations 154 will include in a legacy signal (L-SIG) field included in UL NDPs 224 that will be transmitted by multiple client stations 154 responsive to the trigger frame 600. The BW subfield 628 includes a value indicating a bandwidth corresponding to the UL NDPs 224. The GI and LTF subfield 630 includes a value indicating i) a GI duration to be used for generating OFDM symbols corresponding to the UL NDPs 224, and ii) parameters corresponding to the generation of LTF fields to be included the UL NDPs 224. The MU-MIMO LTF mode subfield 632 includes a value indicating an LTF mode (e.g., single stream pilot HE-LTF mode or masked HE-LTF sequence mode) of the UL NDPs 224. The number of HE-LTF symbols subfield 634 includes a value indicating the number of HE-LTF symbols to be included in UL NDPs 224. The AP transmit power subfield 638 includes a value indicating a combined average power per 20 MHz bandwidth of all transmit antennas used to transmit the trigger frame from the AP 114. The packet extension subfield 640 includes a value indicating a duration of PPDU extension (PE) fields to be added by the client stations 154 at the end of the UL NDPs 224. The HE-SIG-A reserved subfield includes a value indicating to which values the client stations 154 should set reserved bits in the HE-SIG-A2 subfield of the UL NDPs 224. In another embodiment, the subfield 632 and/or subfield 640 are reserved.

FIG. 6C is a diagram of an example format of a user information field 612 of the trigger frame 600, in an embodiment. FIG. 6C indicates example lengths (e.g., in bits) of subfields of the user information field 612. In other embodiments, one or more of the subfields has another suitable length. In some embodiments, one or more of the subfields are omitted and/or one or more additional subfields are included.

The user information field 612 includes an association identifier (AID) 12 subfield 660, a reserved subfield 662, a spatial stream (SS) allocation subfield 664, a target receive signal strength indicator (RSSI) subfield 666, and a reserved subfield 668. In another embodiment, the user information field 612 also includes a trigger dependent user information subfield, e.g., after the reserved subfield 668.

The AID12 subfield 660 includes an identifier of the client station 154 for which the user information field 612 is intended. In an embodiment, the AID 12 subfield 660 includes 12 least significant bits of an AID assigned to the client station 154 by the AP 114. The SS allocation subfield 664 includes a value indicating which spatial streams the client station 154 is to use for transmitting a corresponding UL NDP 224. The target RSSI subfield 666 includes a value indicating a target receive signal power of the UL NDP 224 to be transmitted by the client station 154.

As discussed above, the multiple client stations 154 transmit ranging measurement feedback corresponding to the MU ranging measurement exchange. For instance, in an embodiment, the multiple client stations transmit ranging measurement feedback in UL PPDUs 268 of an UL MU transmission 264, as described above with respect to MU ranging measurement exchange 200. In some embodiments, the AP 114 (e.g., the MAC processor 126) determines that one or more client stations 154 are to include in ranging measurement feedback packets, such as the UL PPDUs 268, one or more of i) recorded time(s) $t_{1,k}$, ii) recorded time(s) $t_{4,k}$, iii) recorded angle(s) $AoD_{1,k}$, iv) recorded angle(s) $AoA_{2,k}$, and v) channel estimate information determined by client station(s) 154 based on reception of the DL NDP(s) 236. In some embodiments, the AP 114 (e.g., the MAC processor 126) determines the granularity(ies) of channel estimate information to be included in the ranging measurement feedback packets.

In an embodiment, the information to be included in the ranging measurement feedback transmitted by the multiple client stations 154 is determined by the AP 114 and indicated in a DL transmission to the multiple client stations 154. For instance, the trigger frame 600 in a DL transmission (for example, DL PPDU 216) includes (e.g., in one or more of subfield 626, subfield 636, subfield 642, subfield 646; in another subfield (not shown in FIG. 6B) formed by consolidating reserved bits from two or more of subfield 626, subfield 636, subfield 642, subfield 646; in one or both of subfield 662 and subfield 668; in another subfield (not shown in FIG. 6C) formed by consolidating reserved bits from subfield 662 and subfield 668) information indicating whether one or more client stations 154 are to include, in ranging measurement feedback packets, one or more of i) recorded time(s) $t_{1,k}$, ii) recorded time(s) $t_{4,k}$, iii) recorded angle(s) $AoD_{1,k}$, iv) recorded angle(s) $AoA_{2,k}$, and v) channel estimate information determined by client station(s) 154 based on reception of the DL NDP(s) 236. In an embodiment where the trigger frame 600 indicates that one or more client stations 154 are to include, in ranging measurement feedback packets, the channel estimate information, the trigger frame 600 further includes an indication of the granularity (ies) of channel estimate information to be included in the ranging measurement feedback packets.

In other embodiments, an indication of what ranging measurement feedback information is to be included in the ranging measurement feedback is included in one or both of the trigger dependent common information subfield 648 and/or the trigger dependent user information subfield (e.g., in the user information field 612).

In other embodiments, however, the trigger frame 600 does not indicate the information to be included by the one or more client stations 154 in ranging measurement feedback packets. For instance, in some such embodiments, the information to be included is determined and indicated to the one or more client stations 154 by the AP 114 during an NDP sounding negotiation that occurs prior to the MU ranging measurement exchange. In another embodiment, the information to be included is indicated to the one or more client stations 154 by the AP 114 in an NDPA frame, such as the NDPA frame included in the DL PPDU 228.

Figure 7A:
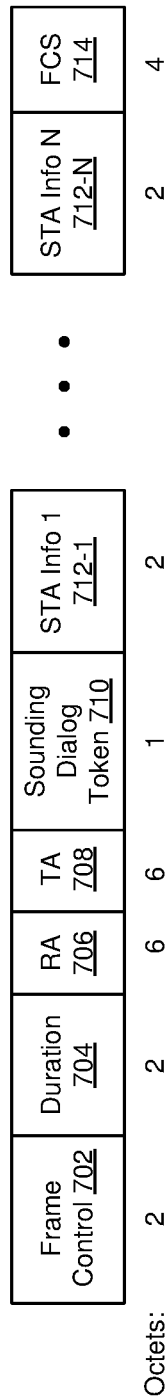
FIG. 7A is an example frame format of a null data packet announcement (NDPA) frame, according to an embodiment.

FIG. 7A is a diagram of an example frame format of a NDPA frame 700 for use in an MU and/or SU ranging measurement exchange, according to an embodiment. Referring now to FIG. 2A, the NDPA frame 700 is the NDPA frame included in the PPDU 228 in the DL NDP transmission portion 208, according to an embodiment. Referring now to FIG. 3A, the NDPA frame 700 is the NDPA frame included in the PPDU 316 in the UL NDP transmission portion 304, according to an embodiment. Referring now to FIG. 4, the NDPA frame 700 is the NDPA frame included in the PPDU 408 in the DL NDP transmission portion 404, according to an embodiment. Referring now to FIG. 5, the NDPA frame 700 is the NDPA frame included in the PPDU 516 in the DL NDP transmission portion 504, according to an embodiment.

In an embodiment, the NDPA frame 700 is generated by the MAC processor 126 of the network interface 122. In another embodiment, the NDPA frame 700 is generated by the MAC processor 166 of the network interface 162. FIG. 7A indicates example lengths (e.g., in terms of octets) of fields of the NDPA frame 700. In other embodiments, length(s) one or more of the fields has another suitable number length. In some embodiments, one or more of the fields are omitted and/or one or more additional fields are included.

In an embodiment, the NDPA frame 700 is similar to an NDPA frame format defined for the IEEE 802.11ac Standard.

The NDPA frame 700 includes a frame control field 702, a duration field 704, an RA field 706, a TA field 708, a sounding dialog token field 710, one or more station (STA) information fields 712, and a frame check sequence (FCS) field 714.

In an embodiment, the frame control field 702 indicates that the frame 700 is an NDPA frame. In one such embodiment, a bit (e.g., bit B0) of the sounding dialog token field 710 is used to indicate that the NDPA frame 700 corresponds to an NDP ranging measurement exchange. In another embodiment, the frame control field 702, by itself, indicates that the frame 700 is an NDPA frame corresponding to an NDP ranging measurement exchange. In another embodiment, another bit of the sounding dialog token field 710 is used to additionally indicate whether the NDPA frame announces a NDP frame transmission in an SU NDP sounding sequence or an MU NDP sounding sequence.

In an embodiment, the duration field 704 includes a value indicating an estimation of a time required for the ranging measurement exchange, in an embodiment. The RA field 706 includes an address corresponding to one or more client stations 154 that are the target recipient of the NDPA frame 700. For instance, in an MU ranging measurement exchange, the RA field 706 includes a broadcast address or a multicast address corresponding to multiple client stations 154 that are intended recipients of the NDPA frame 700. In a SU ranging measurement exchange, the RA field 706 includes an address of a client station 154 or an AP 114 that is an intended recipient of the NDPA frame 700. The TA field includes an address corresponding to the communication device transmitting the NDPA frame 700. In an embodiment, a bit (e.g., bit B1) of the sounding dialog token field 710 is used to indicate that the NDPA frame 700 corresponds to an NDPA frame defined by the IEEE 802.11ac Standard. The remaining bits of the sounding dialog token field 710 are set to a value that is used to identify the NDPA frame 700 as corresponding to an NDP ranging measurement exchange, in an embodiment. The FCS field 714 includes an error detecting code that enables a receiving device to determine whether the trigger frame 700 was received without any errors.

In an embodiment, the number of STA information fields 712 is used to distinguish an NDPA frame as employed in an MU ranging measurement exchange from an NDPA frame as employed in an SU ranging measurement exchange. For instance, the presence of a single STA information field 712 indicates that the NDPA frame 700 corresponds to an SU ranging measurement exchange and the presence of multiple STA information fields 712 indicates that the NDPA frame 700 corresponds to an MU ranging measurement exchange. In an embodiment, the RA field 706 is used to distinguish an NDPA frame as employed in an MU ranging measurement exchange from an NDPA frame as employed in an SU ranging measurement exchange. For instance, the presence of a unicast address in the RA field 706 indicates that the NDPA frame 700 corresponds to an SU ranging measurement exchange, and the presence of a broadcast/multicast address in the RA field 706 indicates that the NDPA frame 700 corresponds to an MU ranging measurement exchange.

Figure 7B:
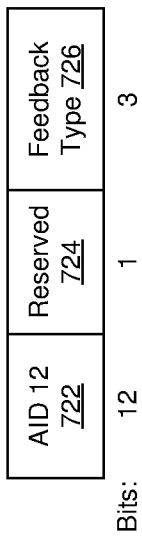
FIG. 7B is an example format of a client station information field within an NDPA frame, according to an embodiment.

FIG. 7B is a diagram of an example format of an STA information field 712 of the NDPA frame 700, in an embodiment. The AID12 subfield 722 includes an identifier (e.g., a 12-bit AID) of the communication device (i.e., AP 114 or client station 154) for which the STA information field 712 is intended. The subfield 724 is reserved.

The feedback type subfield 726 includes information indicating which feedback information is to be included in a ranging measurement feedback packet transmitted by a communication device addressed in the AID12 subfield 722. For instance, in the MU ranging measurement exchange 200, the NDPA frame 700 (having the feedback type subfield 726) is included in the DL PPDU 228, and the subfield 726 indicates whether a client station 154 is to include, in a corresponding ranging measurement feedback packet 268, one or more of i) a recorded time $t_{1,k}$, ii) a recorded time $t_{4,k}$, iii) a recorded angle $AoD_{1,k}$, iv) a recorded angle $AoA_{2,k}$, and v) a channel estimate information determined by the client station 154 based on reception of the DL NDP(s) 236, according to an embodiment.

In the SU ranging measurement exchange 300 or 400, the feedback type subfield 726 (in an NDPA frame 700) included in the PPDU 316 indicates whether the AP 114 is to include, in the downlink ranging measurement feedback packet 332, one or more of i) a recorded time $t_2$, ii) a recorded time $t_3$, iii) a recorded angle $AoD_2$, iv) a recorded angle $AoA_1$, and v) a channel estimate information determined by the AP 114 based on reception of the UL NDP 320, according to an embodiment. Similarly, in the SU ranging measurement exchange 500, the feedback type subfield 726 (in an NDPA frame 700) included in the PPDU 516 indicates whether a client station 154 is to include, in corresponding uplink ranging measurement feedback packet 532, one or more of i) a recorded time $t_2$, ii) a recorded time $t_3$, iii) a recorded angle $AoD_2$, iv) a recorded angle $AoA_1$, and v) a channel estimate information determined by the client station 154 based on reception of the DL NDP 520, according to an embodiment.

In an embodiment in which the feedback type subfield 726 indicates that a communication device is to include, in a corresponding ranging measurement feedback packet, the channel estimate information, the feedback type subfield 726 further includes an indication of the granularity of the channel estimate information to be included in the corresponding ranging measurement feedback packet.

In other embodiments, however, the NDPA frame 700 does not indicate information to be included in a ranging measurement feedback packet transmitted by a communication device addressed in the AID12 subfield 722 and the feedback type field 726 is omitted. For instance, in some such embodiments, the information to be included is determined and indicated to the communication during an NDP sounding negotiation that occurs prior to the MU or SU ranging measurement exchange. In another embodiment, the feedback information to be included is indicated in another suitable field of the NDPA frame 700.

Figure 8A:
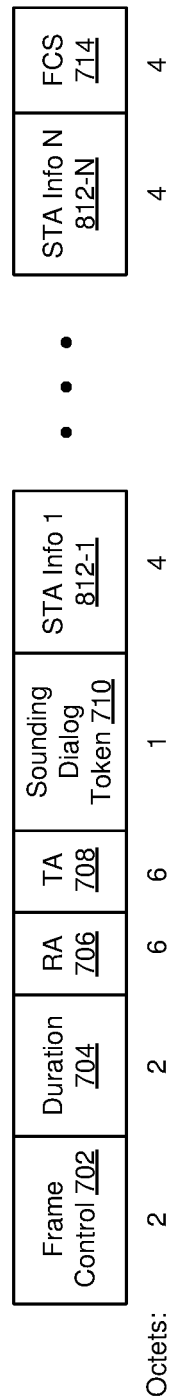
FIG. 8A is another example format of an NDPA frame, according to an embodiment.

FIG. 8A is a diagram of another example frame format of a NDPA frame 800 for use in an MU and/or SU ranging measurement exchange, according to an embodiment. Referring now to FIG. 2A, the NDPA frame 800 is the NDPA frame included in the PPDU 228 in the DL NDP transmission portion 208, according to an embodiment. Referring now to FIG. 3A, the NDPA frame 800 is the NDPA frame included in the PPDU 316 in the UL NDP transmission portion 304, according to an embodiment. Referring now to FIG. 4, the NDPA frame 800 is the NDPA frame included in the PPDU 408 in the DL NDP transmission portion 404, according to an embodiment. Referring now to FIG. 5, the NDPA frame 800 is the NDPA frame included in the PPDU 516 in the DL NDP transmission portion 504, according to an embodiment.

In an embodiment, the NDPA frame 800 is generated by the MAC processor 126 of the network interface 122. In another embodiment, the NDPA frame 800 is generated by the MAC processor 166 of the network interface 162. FIG. 8A indicates example lengths (e.g., in terms of octets) of fields of the NDPA frame 800. In other embodiments, length(s) one or more of the fields has another suitable number length. In some embodiments, one or more of the fields are omitted and/or one or more additional fields are included.

In an embodiment, the NDPA frame 800 is similar to an NDPA frame format as described in draft 2.2 of the IEEE 802.11ax Standard, dated February 2018.

The NDPA frame 800 is similar to the NDPA frame 700, and like-numbered elements are not discussed in detail for purposes of brevity. The NDPA frame 800 includes one or more STA information fields 812.

Figure 8B:
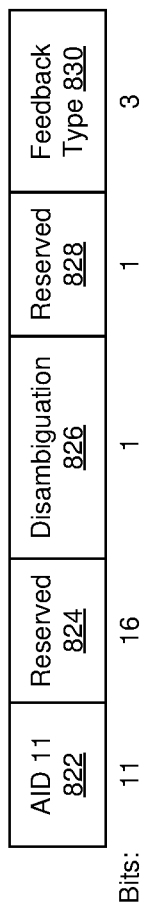
FIG. 8B is an example format of a client station information field within an NDPA frame, according to an embodiment.

FIG. 8B is a diagram of an example format of the STA information field 812, according to an embodiment. The AID11 subfield 822 includes an identifier of the communication device (i.e., AP 114 or client station 154) for which the STA information field 812 is intended. In an embodiment, the AID11 subfield 822 includes an 11-bit AID.

Subfields 824 and 828 are reserved. A disambiguation field 826 includes information to help prevent a communication device operating according to a different communication protocol from improperly processing the NDPA frame 800. A feedback type subfield 830 includes information that indicates which feedback information is to be included in a ranging measurement feedback packet transmitted by a communication device addressed in the AID11 subfield 822. The feedback type subfield 830 is similar to the feedback type subfield 726 and is not described in detail for purposes of brevity.

In some embodiments, the NDPA frame 800 does not indicate information to be included in a ranging measurement feedback packet transmitted by a communication device addressed in the AID11 subfield 822 and the feedback type field 830 is omitted. For instance, in some such embodiments, the information to be included is determined and indicated to the communication during an NDP sounding negotiation that occurs prior to the MU or SU ranging measurement exchange. In another such embodiment, the information to be included is indicated in another field of the NDPA frame 800.

Figure 9:
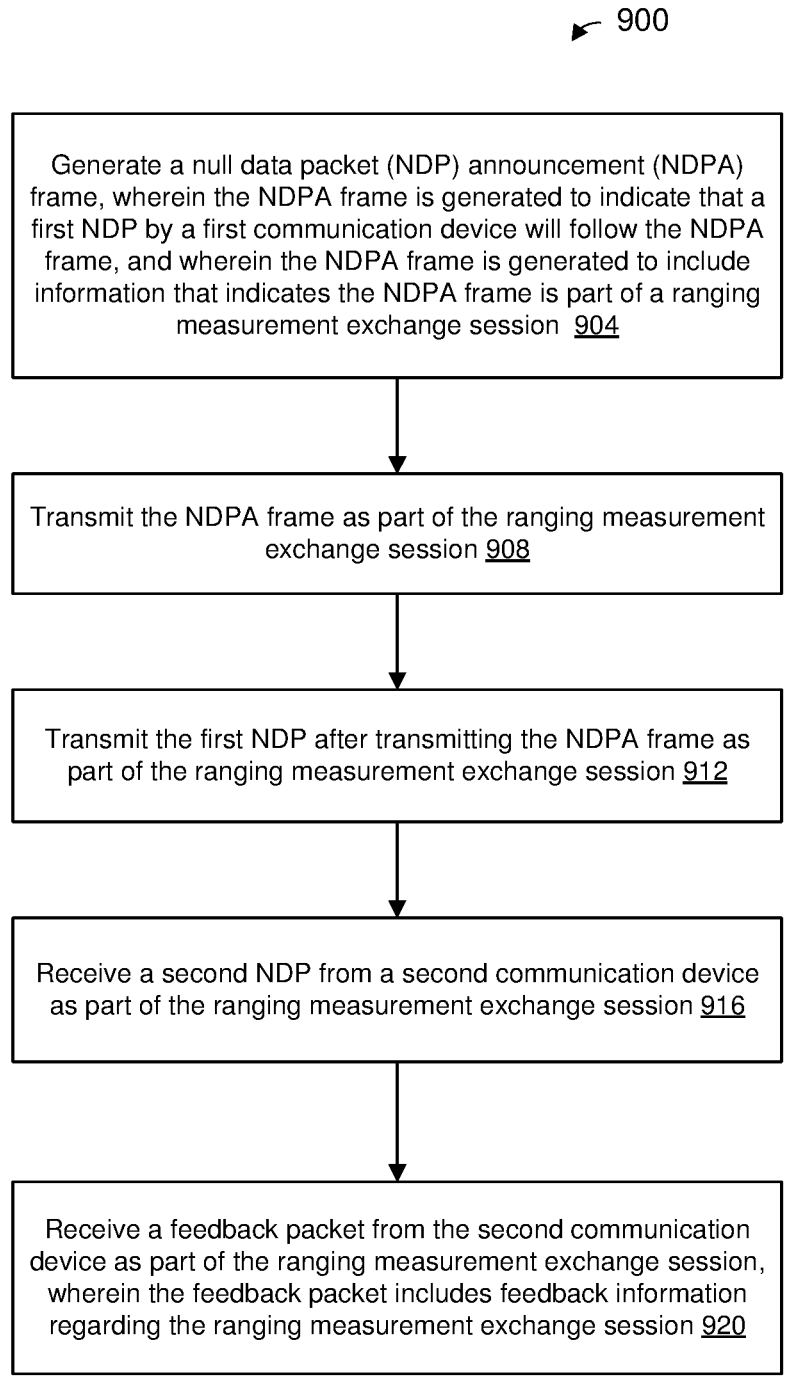
FIG. 9 is a flow diagram of an example method for performing a ranging measurement procedure, according to an embodiment.

FIG. 9 is a flow diagram of an example method 900 for performing a ranging measurement procedure, according to an embodiment. In some embodiments, the network interface device 162 of FIG. 1 is configured to implement the method 900. The method 900 is described, however, in the context of the network interface device 162 merely for explanatory purposes and, in other embodiments, the method 900 is implemented by another suitable device. For instance, in an embodiment, the method the network interface device 122 of FIG. 1 is configured to implement the method 900.

At block 904, the network interface device 162 generates an NDPA frame, wherein the NDPA frame is generated to indicate that a first NDP will be transmitted by the network interface device 162 following the transmission of the NDPA frame, and further includes information that indicates that the NDPA frame is part of a ranging measurement exchange session. For instance, in an embodiment, a frame control field within the NDPA frame indicates that the NDPA frame is a part of a ranging measurement exchange session. In an embodiment, the NDPA frame indicates what feedback information to be included in a feedback packet transmitted by another communication device as part of the ranging measurement exchange session. In an embodiment, the NDPA frame is generated according to formats described with respect to FIG. 7 and/or FIG. 8. In another embodiment, the NDPA frame is generated according to another suitable format.

At block 908, the network interface device 162 transmits the NDPA frame to another communication device as part of the ranging measurement exchange session. For instance, the network interface device transmits the NDPA frame in a PPDU, such as a PPDU 316 described above, to the other communication device. As another example, the network interface device transmits the NDPA frame in a PPDU, such as a PPDU 408 described above, to the other communication device. As another example, the network interface device transmits the NDPA frame in a PPDU, such as a PPDU 516 described above, to the other communication device.

At block 912, after transmitting the NDPA frame, the network interface device 162 transmits a first NDP as part of the ranging measurement exchange session. In an embodiment, the network interface device 162 transmits an UL NDP, such as the UL NDP 320 described above, to the other communication device following the transmission of the NDPA frame. As another example, the network interface device transmits a DL NDP, such as the DL NDP 328 or the DL NDP 520 described above.

At block 916, the network interface device 162 receives a second NDP from the other communication device as part of the ranging measurement exchange session. In an embodiment, the network interface device 162 receives a DL NDP, such as the DL NDP 328, from the other communication device following the transmission of the first NDP frame. As another example, the network interface device receives an UL NDP, such as the UL NDP 320 or the UL NDP 528 described above.

At block 920, the network interface device 162 receives a feedback packet from the other communication device as part of the ranging measurement exchange session, wherein the feedback packet includes feedback information regarding the ranging measurement exchange session. In an embodiment, the feedback packet includes information that was previously indicated in the NDPA frame. In an embodiment, the feedback packet includes information determined based on the reception of the first NDP packet at the other communication device and the transmission of the second NDP packet from the other communication device.

Figure 10:
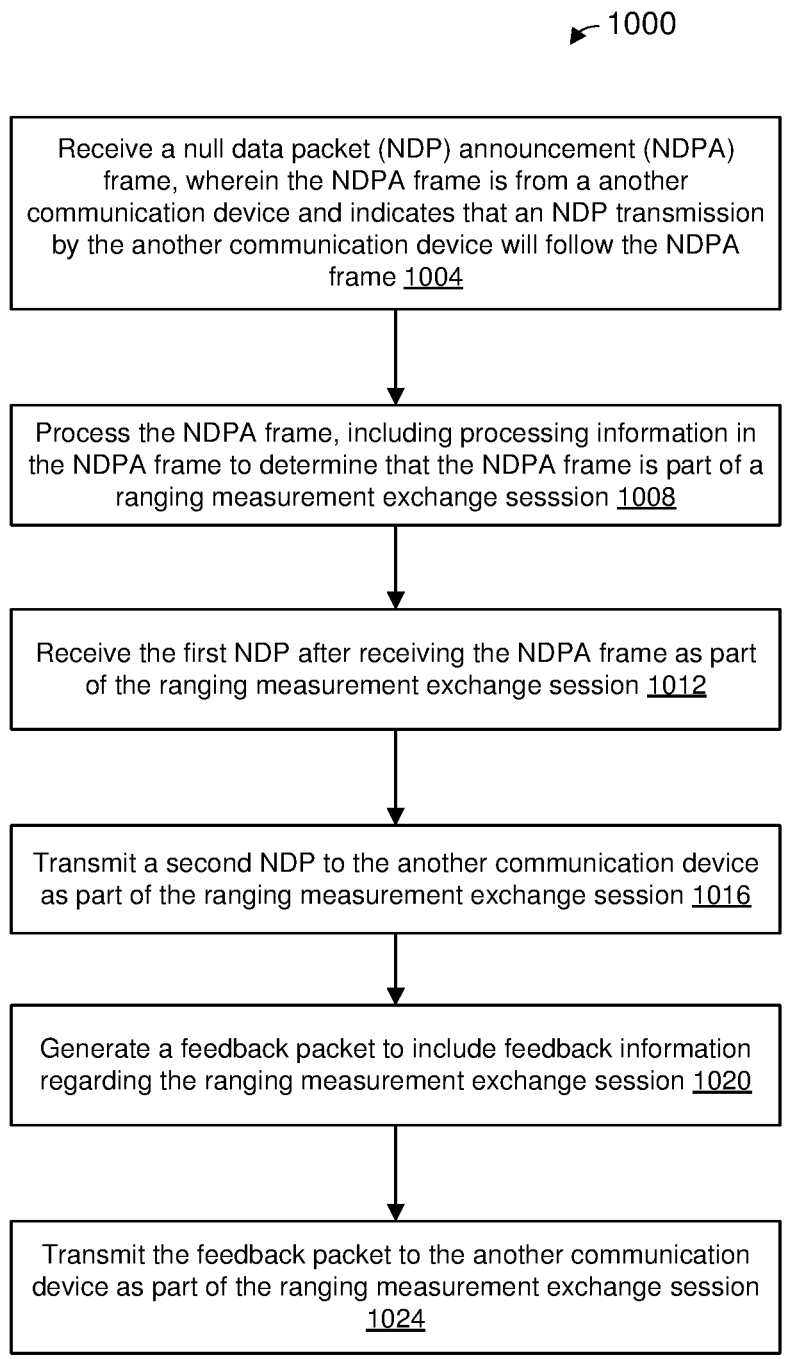
FIG. 10 is a flow diagram of another example method for performing a ranging measurement procedure, according to an embodiment.

FIG. 10 is a flow diagram of an example method 1000 for performing a ranging measurement procedure, according to an embodiment. In some embodiments, the network interface device 122 of FIG. 1 is configured to implement the method 1000. The method 1000 is described, however, in the context of the network interface device 122 merely for explanatory purposes and, in other embodiments, the method 1000 is implemented by another suitable device. For instance, in an embodiment, the method the network interface device 162 of FIG. 1 is configured to implement the method 1000.

At block 1004, the network interface device 122 receives an NDPA frame from another communication device. The NDPA frame indicates that an NDP transmission from the other communication device will follow the NDPA frame and further indicates that the NDPA frame is part of a ranging measurement exchange session. In an embodiment, the NDPA frame indicates what feedback information is to be included in a feedback packet transmitted by the network interface device 122. In an embodiment, the received NDPA frame is formatted according to the formats described with respect to the NDPA frame 700 or the NDPA frame 800. In another embodiment, the network interface device 162 receives the NDPA frame.

At block 1008, the network interface device 122 processes information in the received NDPA frame and determines that the NDPA frame is part of a ranging measurement exchange session. For instance, in an embodiment, the network interface device 122 processes information in a frame control field and/or a sounding dialog token field within the NDPA frame to determine that the NDPA frame is a part of a ranging measurement exchange session.

At block 1012, the network interface device 122 receives a first NDP, from the other communication device, as part of the ranging measurement exchange session. For instance, the network interface device 122 receives an NDP 320 as described above. As another example, the network interface device 162 receives a DL NDP, such as the DL NDP 328 or the DL NDP 520 described above.

At block 1016, the network interface device 122 transmits a second NDP, to the other communication device, as part of the ranging measurement exchange session. For instance, the network interface device 122 transmits an NDP 328 as described above. As another example, the network interface device 162 transmits an UL NDP, such as the UL NDP 320 or the UL NDP 528 described above.

At block 1020, the network interface device 122 generates a feedback packet, wherein the feedback packet includes feedback information regarding the ranging measurement exchange session. In an embodiment, the feedback packet includes information that was previously indicated in the NDPA frame, such as the NDPA frame received at block 1004. In an embodiment, the feedback packet includes information determined based on the reception of the first NDP packet at the network interface device 122 and the transmission of the second NDP packet by the network interface device 122.

At block 1024, the network interface device 122 transmits the feedback packet as generated at block 1020.

Figure 11:
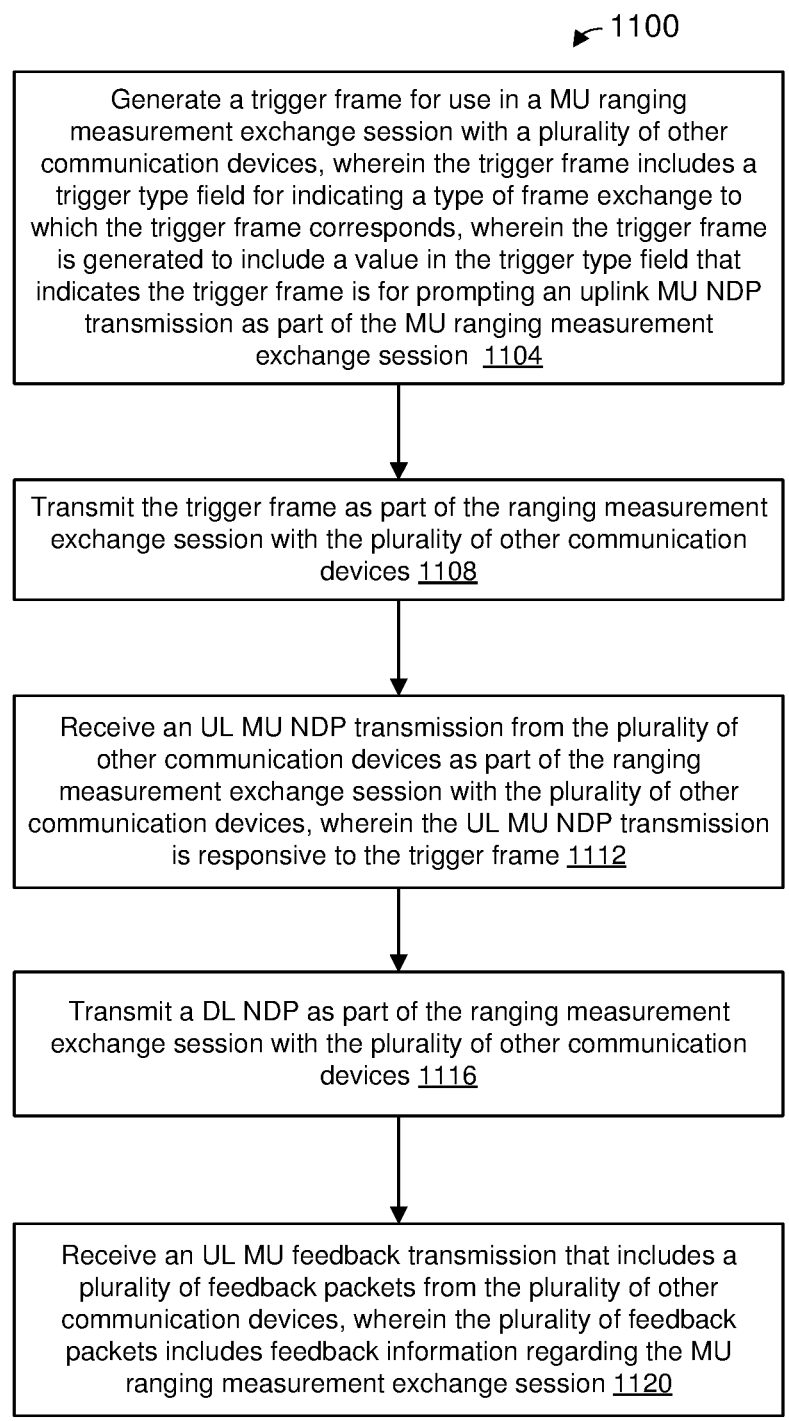
FIG. 11 is a flow diagram of another example method for performing a MU ranging measurement procedure, according to an embodiment.

FIG. 11 is a flow diagram of an example method 1100 for performing a MU ranging measurement procedure, according to an embodiment. In some embodiments, the network interface device 122 of FIG. 1 is configured to implement the method 1100. The method 1100 is described, however, in the context of the network interface device 122 merely for explanatory purposes and, in other embodiments, the method 1100 is implemented by another suitable device.

At block 1104, the network interface device 122 generates a trigger frame for MU ranging measurement exchange session with a plurality of other communication devices. The trigger frame includes a trigger type field for indicating a type of frame exchange to which the trigger frame corresponds, wherein a value in the trigger type field indicates that the trigger frame is for prompting an uplink MU NDP transmission as part of the MU ranging measurement exchange session. In an embodiment, the trigger frame further indicates what feedback information is to be included in a feedback packet transmitted by one or more of the plurality of other communication devices. In an embodiment, the trigger frame is generated according to the format described with respect trigger frame 600.

At block 1108, the network interface device 122 transmits the trigger frame to the plurality of other communication devices as part of the MU ranging measurement exchange session. For instance, in an embodiment, the network interface device 122 transmits the trigger frame to the client stations 154.

At block 1112, the network interface device 122 receives an uplink MU NDP transmission from the plurality of other communication devices, as part of the MU ranging measurement exchange session, wherein the uplink MU NDP transmission is responsive to the trigger frame. In an embodiment, the uplink MU NDPs are transmitted using MU-MIMO by the plurality of other communication devices, for example, a plurality of client stations 154.

At block 1116, the network interface device 122 transmits a downlink NDP to the plurality of other communication devices as part of the MU ranging measurement exchange session.

At block 1120, the network interface device 122 receives an uplink MU feedback transmission that includes a plurality of feedback packets from the plurality of other communication devices, wherein the feedback packets include feedback information regarding the MU ranging measurement exchange session. In an embodiment, the feedback packets includes feedback information that was previously indicated in the trigger frame, such as the NDPA frame transmitted at block 1104. In an embodiment, the feedback packets includes information determined based on the transmission of the uplink MU NDP packet from the plurality of other communication devices and the reception of the downlink NDP packet at the plurality of other communication devices.

Figure 12:
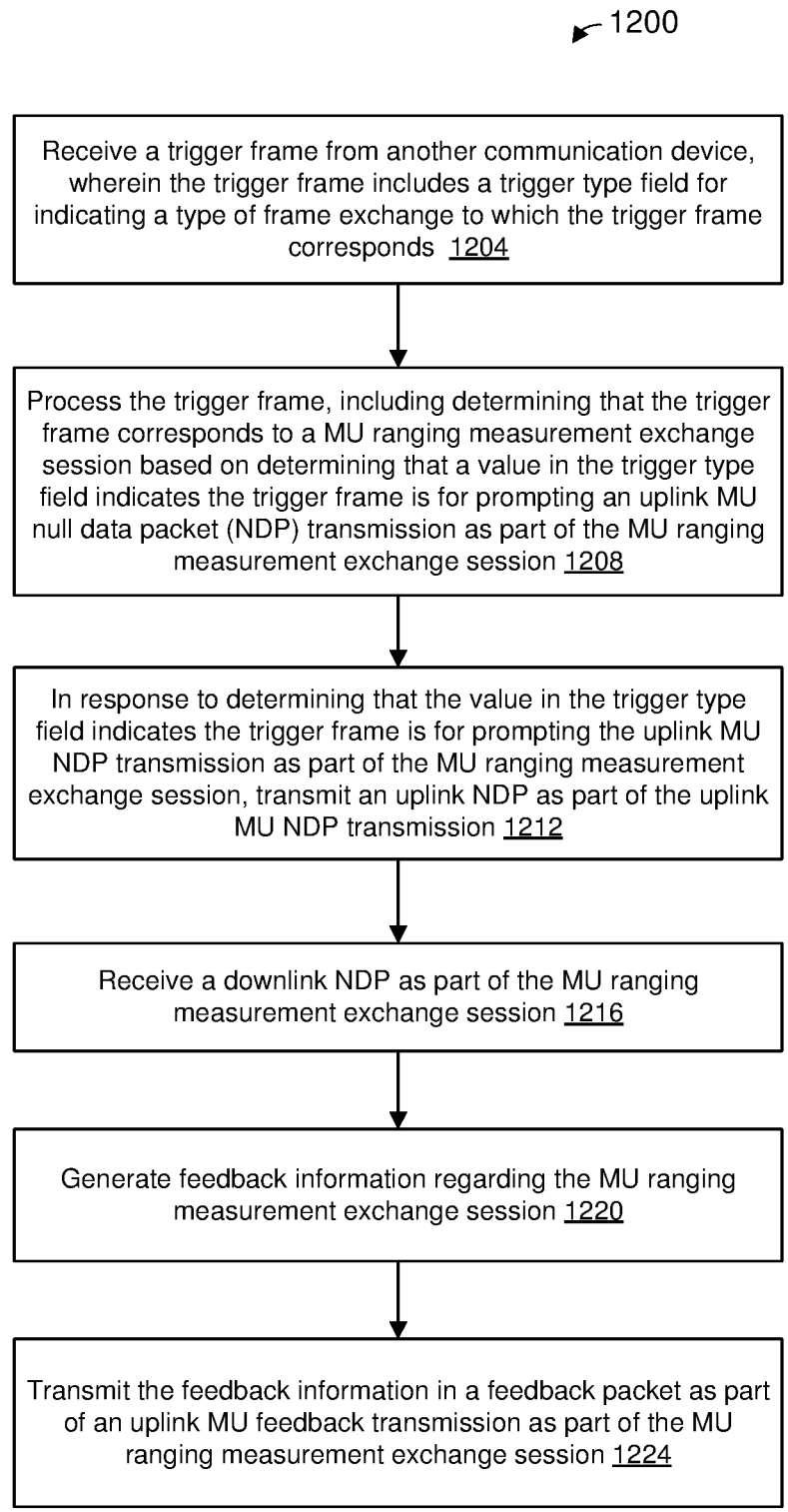
FIG. 12 is a flow diagram of another example method for performing a MU ranging measurement procedure, according to an embodiment

FIG. 12 is a flow diagram of an example method 1200 for performing a MU ranging measurement procedure, according to an embodiment. In some embodiments, the network interface device 162 of FIG. 1 is configured to implement the method 1200. The method 1200 is described, however, in the context of the network interface device 162 merely for explanatory purposes and, in other embodiments, the method 1200 is implemented by another suitable device.

At block 1204, the network interface device 162 receives a trigger frame from another communication device, wherein the trigger frame includes a trigger type field for indicating a type of frame exchange to which the trigger frame corresponds. In an embodiment, the trigger frame includes a trigger type field that indicates that the trigger frame corresponds to an MU ranging measurement exchange session and is for prompting an uplink MU NDP transmission. In an embodiment, the trigger frame further indicates what feedback information is to be included in a feedback packet to be transmitted by the network interface device 162. In an embodiment, the received trigger frame is formatted according to the format described with respect to trigger frame 600.

At block 1208, the network interface device 162 processes the trigger frame received at block 1204 and determines that the trigger frame corresponds to an MU ranging measurement exchange session based on determining that a value in the trigger type field indicates that the trigger frame is for prompting an uplink MU NDP transmission as part of the MU ranging measurement exchange session.

At block 1212 and in response to determining that the value in the trigger type field indicates that the trigger frame is for prompting the uplink MU NDP transmission as part of the MU ranging measurement exchange session, the network interface device 162 transmits an uplink NDP as part of the uplink MU NDP transmission. In an embodiment, the uplink NDP is transmitted using MU-MIMO as part of an uplink MU NDP transmission from multiple communication devices. For instance, the network interface device 162 transmits an NDP 224 as described above in the context of the MU ranging measurement exchange 200.

At block 1216, the network interface device 162 receives a downlink NDP as part of the MU ranging measurement exchange session. For instance, the network interface device 162 receives an NDP 236 as described above in the context of the MU ranging measurement exchange 200.

At block 1220, the network interface device 162 generates feedback information, wherein the feedback information corresponds to the MU ranging measurement exchange session. In an embodiment, the feedback information includes information that was previously indicated, by the trigger frame, to be included in a feedback packet. In an embodiment, the feedback information includes information determined based on the transmission of the uplink NDP packet by the network interface device 162 and the reception of the downlink NDP packet at the network interface device 162.

At block 1224, the network interface device 162 transmits the generated feedback information in a feedback packet as part of an uplink MU feedback transmission in the MU ranging exchange session.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for performing a ranging measurement procedure, the method comprising:
   determining, at a first communication device, at least one of i) whether a second communication device is to provide angle of arrival information in a feedback packet as part of a ranging measurement exchange session, and ii) whether the second communication device is to provide angle of departure information in the feedback packet;
   generating, at the first communication device, a null data packet (NDP) announcement (NDPA) frame, wherein the NDPA frame is generated to indicate that the first communication device will transmit a first NDP after transmitting the NDPA frame, wherein the NDPA frame is generated to include information indicating that the NDPA frame is part of the ranging measurement exchange session, and wherein the NDPA frame is generated to include at least one of a) an indicator of whether the second communication device is to provide angle of arrival information in the feedback packet, and b) an indicator of whether the second communication device is to provide angle of departure information in the feedback packet;
   transmitting, by the first communication device, the NDPA frame as part of the ranging measurement exchange session;
   transmitting, by the first communication device, the first NDP after transmitting the NDPA frame as part of the ranging measurement exchange session;
   receiving, at the first communication device, a second NDP from the second communication device as part of the ranging measurement exchange session; and
   receiving, at the first communication device, the feedback packet from the second communication device as part of the ranging measurement exchange session, wherein the feedback packet includes feedback information regarding the ranging measurement exchange session, and wherein the feedback information in the feedback packet is consistent with the at least one of a) the indicator of whether the second communication device is to provide angle of arrival information in the feedback packet, and b) the indicator of whether the second communication device is to provide angle of departure information in the feedback packet.

2. The method of claim 1, further comprising:
   wherein the NDPA frame is generated to include a station information field having an identifier of the second communication device, and wherein one of
      i) the station information field is generated to include the at least one of a) the indicator of whether the second communication device is to provide angle of arrival information in the feedback packet, and b) the indicator of whether the second communication device is to provide angle of departure information in the feedback packet, or
      ii) the NDPA frame is generated to include another field in the NDPA frame, separate from the station information field, that includes the at least one of a) the indicator of whether the second communication device is to provide angle of arrival information in the feedback packet, and b) the indicator of whether the second communication device is to provide angle of departure information in the feedback packet.

3. The method of claim 2, further comprising:
   determining, at the first communication device, whether the second communication device is to provide channel estimation information in the feedback packet to be transmitted as part of the ranging measurement exchange session;
   wherein one of:
      i) the station information field is generated to include an indicator of whether the second communication device is to provide channel estimation information in the feedback packet, or
      ii) the other field, separate from the station information field, in the NDPA frame is generated to include the indicator of whether the second communication device is to provide channel estimation information in the feedback packet.

4. The method of claim 3, further comprising, at least when the first communication device determines that the second communication device is to provide channel estimation information in the feedback packet:
   determining, at the first communication device, a granularity of channel estimation information from among a plurality of different granularities of the channel estimation information;

wherein one of:
i) the station information field is generated to include an indicator of the determined granularity, or
ii) the other field, separate from the station information field, in the NDPA frame is generated to include the indicator of the determined granularity.

5. An apparatus, comprising:
a network interface device associated with a first communication device, wherein the network interface device includes one or more integrated circuits (ICs), and wherein the network interface device is configured to:
determine at least one of i) whether a second communication device is to provide angle of arrival information in a feedback packet as part of a ranging measurement exchange session, and ii) whether the second communication device is to provide angle of departure information in the feedback packet,
generate a null data packet (NDP) announcement (NDPA) frame, wherein the NDPA frame is generated to indicate that the network interface device will transmit a first NDP after transmitting the NDPA frame, and wherein the NDPA frame is generated to include information indicating that the NDPA frame is part of the ranging measurement exchange session, and wherein the NDPA frame is generated to include at least one of a) an indicator of whether the second communication device is to provide angle of arrival information in the feedback packet, and b) an indicator of whether the second communication device is to provide angle of departure information in the feedback packet,
transmit the NDPA frame as part of the ranging measurement exchange session,
transmit the first NDP after transmitting the NDPA frame as part of the ranging measurement exchange session,
receive a second NDP from the second communication device as part of the ranging measurement exchange session, and
receive the feedback packet from the second communication device as part of the ranging measurement exchange session, wherein the feedback packet includes feedback information regarding the ranging measurement exchange session, and wherein the feedback information in the feedback packet is consistent with the at least one of a) the indicator of whether the second communication device is to provide angle of arrival information in the feedback packet, and b) the indicator of whether the second communication device is to provide angle of departure information in the feedback packet.

6. The apparatus of claim 5, wherein the network interface device is further configured to:
generate the NDPA frame to include a station information field having an identifier of the second communication device, and wherein one of
i) the station information field is generated to include the at least one of a) the indicator of whether the second communication device is to provide angle of arrival information in the feedback packet, and b) the indicator of whether the second communication device is to provide angle of departure information in the feedback packet, or
ii) the NDPA frame is generated to include another field in the NDPA frame, separate from the station information field, that includes the at least one of a) the indicator of whether the second communication device is to provide angle of arrival information in the feedback packet, and b) the indicator of whether the second communication device is to provide angle of departure information in the feedback packet.

7. The apparatus of claim 6, wherein the network interface device is further configured to:
determine whether the second communication device is to provide channel estimation information in the feedback packet to be transmitted as part of the ranging measurement exchange session;
wherein one of:
i) the station information field is generated to include an indicator of whether the second communication device is to provide channel estimation information in the feedback packet, or
ii) the other field, separate from the station information field, in the NDPA frame is generated to include the indicator of whether the second communication device is to provide channel estimation information in the feedback packet.

8. The apparatus of claim 7, wherein the network interface device is further configured to, at least when the network interface device is determines that the second communication device is to provide channel estimation information in the feedback packet:
determine a granularity of channel estimation information from among a plurality of different granularities of the channel estimation information;
wherein one of:
i) the station information field is generated to include an indicator of the determined granularity, or
ii) the other field, separate from the station information field, in the NDPA frame is generated to include the indicator of the determined granularity.

9. A method for performing a ranging measurement procedure, the method comprising:
receiving, at a first communication device, a null data packet (NDP) announcement (NDPA) frame, wherein the NDPA frame is from a second communication device and indicates that the second communication device will transmit an NDP transmission after transmitting the NDPA frame, and wherein the NDPA frame includes at least one of a) an indicator of whether the first communication device is to provide angle of arrival information in a feedback packet as part of a ranging measurement exchange session, and b) an indicator of whether the first communication device is to provide angle of departure information in the feedback packet;
processing, at the first communication device, the NDPA frame, including processing information in the NDPA frame to determine that the NDPA frame is part of the ranging measurement exchange session and to determine at least one of i) whether the first communication device is to provide angle of arrival information in the feedback packet, and ii) whether the first communication device is to provide angle of departure information in the feedback packet, using the at least one of a) the indicator of whether the first communication device is to provide angle of arrival information in the feedback packet, and b) the indicator of whether the first communication device is to provide angle of departure information in the feedback packet;
receiving, at the first communication device, a first NDP after receiving the NDPA frame as part of the ranging measurement exchange session;

transmitting, at the first communication device, a second NDP to the second communication device as part of the ranging measurement exchange session;

generating, at the first communication device, the feedback packet to include feedback information regarding the ranging measurement exchange session, including generating the feedback information in the feedback packet to be consistent with the at least one of a) the indicator of whether the first communication device is to provide angle of arrival information in the feedback packet, and b) the indicator of whether the first communication device is to provide angle of departure information in the feedback packet; and transmitting, by the first communication device, the feedback packet to the second communication device as part of the ranging measurement exchange session.

10. The method of claim 9, wherein:

the NDPA frame includes a station information field having an identifier of the first communication device; and one of
  i) the station information field includes the at least one of a) the indicator of whether the first communication device is to provide angle of arrival information in a feedback packet, and b) the indicator of whether the first communication device is to provide angle of departure information in the feedback packet, or
  ii) the NDPA frame includes another field in the NDPA frame, separate from the station information field, that includes the at least one of a) the indicator of whether the first communication device is to provide angle of arrival information in the feedback packet, and b) the indicator of whether the first communication device is to provide angle of departure information in the feedback packet.

11. The method of claim 10, wherein:

one of:
  i) the station information field in the NDPA frame includes an indicator of whether the first communication device is to provide channel estimation information in the feedback packet, or
  ii) the other field, separate from the station information field, in the NDPA frame includes the indicator of whether the first communication device is to provide channel estimation information in the feedback packet;

the NDPA frame is processed to determine whether the first communication device is to provide channel estimation information in the feedback packet; and the feedback information in the feedback packet is generated to be consistent with the indicator of whether the first communication device is to provide channel estimation information in the feedback packet.

12. The method of claim 11, wherein, at least when the first communication device determines that the first communication device is to provide channel estimation information in the feedback packet:

one of:
  i) the station information field in the NDPA frame includes an indicator of a granularity of channel estimation information, selected from among a plurality of different granularities of the channel estimation information, or
  ii) the other field, separate from the station information field, in the NDPA frame includes the indicator of granularity of channel estimation information;

the NDPA frame is processed to determine the granularity of the channel estimation information that the first communication device is to provide in the feedback packet; and the feedback information in the feedback packet is generated to include channel estimation information at the determined granularity.

13. An apparatus, comprising:

a network interface device associated with a first communication device, wherein the network interface device includes one or more integrated circuits (ICs), and wherein the network interface device is configured to:
  receive a null data packet (NDP) announcement (NDPA) frame, wherein the NDPA frame is from a second communication device and indicates that the second communication device will transmit an NDP transmission after transmitting the NDPA frame, and wherein the NDPA frame includes at least one of a) an indicator of whether the first communication device is to provide angle of arrival information in a feedback packet as part of a ranging measurement exchange session, and b) an indicator of whether the first communication device is to provide angle of departure information in the feedback packet,
  process the NDPA frame, including processing information in the NDPA frame to determine that the NDPA frame is part of the ranging measurement exchange session and to determine at least one of i) whether the first communication device is to provide angle of arrival information in the feedback packet, and ii) whether the first communication device is to provide angle of departure information in the feedback packet, using the at least one of a) the indicator of whether the first communication device is to provide angle of arrival information in the feedback packet, and b) the indicator of whether the first communication device is to provide angle of departure information in the feedback packet,
  receive a first NDP after receiving the NDPA frame as part of the ranging measurement exchange session,
  transmit a second NDP to the second communication device as part of the ranging measurement exchange session,
  generate the feedback packet to include feedback information regarding the ranging measurement exchange session, including generating the feedback information in the feedback packet to be consistent with the at least one of a) the indicator of whether the first communication device is to provide angle of arrival information in the feedback packet, and b) the indicator of whether the first communication device is to provide angle of departure information in the feedback packet, and
  transmit the feedback packet to the second communication device as part of the ranging measurement exchange session.

14. The apparatus of claim 13, wherein:

the NDPA frame includes a station information field having an identifier of the first communication device;

one of
  i) the station information field includes the at least one of a) the indicator of whether the first communication device is to provide angle of arrival information in a feedback packet, and b) the indicator of whether the first communication device is to provide angle of departure information in the feedback packet, or ii) the NDPA frame includes another field in the NDPA frame, separate from the station information field, that includes the at least one of a) the indicator of whether the first communication device is to provide angle of arrival information in the feedback packet, and b) the indicator of whether the first communication device is to provide angle of departure information in the feedback packet.

15. The apparatus of claim 14, wherein:
one of:
   i) the station information field in the NDPA frame includes an indicator of whether the first communication device is to provide channel estimation information in the feedback packet, or
   ii) the other field, separate from the station information field, in the NDPA frame includes the indicator of whether the first communication device is to provide channel estimation information in the feedback packet;

the network interface device is configured to process the NDPA frame to determine whether the first communication device is to provide channel estimation information in the feedback packet; and the network interface device is configured to generate the feedback information in the feedback packet to be consistent with the indicator of whether the first communication device is to provide channel estimation information in the feedback packet.

16. The apparatus of claim 15, wherein, at least when the network interface device determines that the network interface device is to provide channel estimation information in the feedback packet:
one of:
   i) the station information field in the NDPA frame includes an indicator of a granularity of channel estimation information, selected from among a plurality of different granularities of the channel estimation information, or
   ii) the other field, separate from the station information field, in the NDPA frame includes the indicator of granularity of channel estimation information;

the network interface device is configured to process the NDPA frame to determine the granularity of the channel estimation information that the first communication device is to provide in the feedback packet; and the network interface device is configured to generate the feedback information in the feedback packet to include channel estimation information at the determined granularity.

* * * * *